US006721060B1

(12) United States Patent
Kawamura et al.

(10) Patent No.: US 6,721,060 B1

(45) Date of Patent: Apr. 13, 2004

(54) RECORDING MEDIUM CUTTER IMAGE FORMING DEVICE USING SAME

(75) Inventors: Iwao Kawamura, Tokyo (JP); Ryouma Suzuki, Tokyo (JP); Kazuhiro Murakami, Tokyo (JP); Naoki Kiyohara, Tokyo (JP); Kensuke Izuma, Tokyo (JP); Kiyokazu Namekata, Tokyo (JP); Tatsuo Fujimura, Tokyo (JP); Mitsuharu Takizawa, Tokyo (JP); Keiko Nazuka, Tokyo (JP)

(73) Assignee: Canon Finetech Inc., Ibaraki (JP)

( * ) Notice: Subject to any disclaimer, the term of this patent is extended or adjusted under 35 U.S.C. 154(b) by 373 days.

(21) Appl. No.: 09/180,038

(22) PCT Filed: Apr. 28, 1997

(86) PCT No.: PCT/JP97/01472

§ 371 (c)(1),
(2), (4) Date: Sep. 23, 1999

(87) PCT Pub. No.: WO97/40988

PCT Pub. Date: Nov. 6, 1997

(30) Foreign Application Priority Data

| | | |
|---|---|---|
| May 1, 1996 | (JP) | 8-109995 |
| Jun. 25, 1996 | (JP) | 8-164947 |
| Jun. 28, 1996 | (JP) | 8-188207 |

(51) Int. Cl.[7] .......... G06K 15/00

(52) U.S. Cl. .......... 358/1.3; 83/863; 83/864

(58) Field of Search .......... 83/861–887; 358/1.3, 358/304

(56) References Cited

U.S. PATENT DOCUMENTS

| | | | | |
|---|---|---|---|---|
| 4,559,855 A | | 12/1985 | Schieck | 83/425.3 |
| 4,721,058 A | * | 1/1988 | Hayamizu | 118/665 |
| 4,726,271 A | * | 2/1988 | McEwan | 83/155 |

(List continued on next page.)

FOREIGN PATENT DOCUMENTS

| | | |
|---|---|---|
| EP | 0 594 306 | 4/1994 |
| JP | 63-154378 | 6/1988 |
| JP | 5-110820 | 4/1993 |

(List continued on next page.)

*Primary Examiner*—David Moore
*Assistant Examiner*—King T. Poon
(74) *Attorney, Agent, or Firm*—Dellett & Walters

(57) ABSTRACT

A recording medium cutter capable of moving between two positions, a cutting position and a non-cutting position, in a short time, and also capable of cutting a recording medium at accurate positions. A main body (40) rotatably holding a rotary blade (32) and a driven blade (34) is located between side plates (36 and 38) of the cutter (30). A main shaft (39) serving as the center shaft of the rotary blade (32) is rotatably secured to the side plates (36 and 38). The main shaft (39) also serves as the rotating shaft of the main body (40). A driving motor is secured to the mounting plate (42) of the side plate (36). When the main shaft (39) is rotated by the driving motor (44), the rotary blade (32) rotates. Because the driven blade (34) is pressed against the side face of the rotary blade (32), as the rotary blade (32) rotates, the driven blade (34) revolves around the main shaft (39). As a result, the main body (40) also rotates around the main shaft (39). When the main body (40) is moved from the non-cutting position to the cutting position, the rotation of the main body (40) is stopped the moment that a stopper (41) of the main body (40) comes into contact with a stopping plate (50), whereas the rotary blade (32) continues to rotate. When the main body (40) is moved from the cutting position to the non-cutting position, the rotation of the main body (40) is stopped the moment that a lever (58), engaged with the main body during rotation, comes into contact with a hole's extreme end (38) of the side plate (38). At this time, a sensor bar (60) of the lever (58) turns a sensor (62) off, causing the driving motor (44) to be turned off.

15 Claims, 22 Drawing Sheets

U.S. PATENT DOCUMENTS

| | | | | | |
|---|---|---|---|---|---|
| 4,784,318 | A | * | 11/1988 | Bay | 234/2 |
| 4,854,204 | A | * | 8/1989 | Faltin | 83/500 |
| 5,017,257 | A | * | 5/1991 | Murphy | 156/268 |
| 5,042,349 | A | * | 8/1991 | Komatsu | 83/501 |
| 5,099,734 | A | * | 3/1992 | Sugiyama et al. | 83/498 |
| 5,237,898 | A | * | 8/1993 | Kubisiak | 83/227 |
| 5,553,528 | A | | 9/1996 | Zoltner | 83/443 |
| 5,628,864 | A | * | 5/1997 | Kataigi et al. | 156/441.5 |

FOREIGN PATENT DOCUMENTS

| | | |
|---|---|---|
| JP | 05-293794 | 11/1993 |
| JP | 06-091592 | 4/1994 |
| JP | 06-115798 | 4/1994 |

* cited by examiner

FIG.22

SHEET SIZE TABLE

170

| SIZE | WIDTH (mm) | LENGTH (mm) |
|---|---|---|
| A0R | 841 | 1189 |
| A1 | 841 | 594 |
| A1R | 594 | 841 |
| A2 | 594 | 420 |
| A2R | 420 | 594 |
| A3 | 420 | 297 |
| A3R | 297 | 420 |
| A4 | 297 | 210 |
| A4R | 210 | 297 |

RECORDING MEDIUM CUTTER IMAGE FORMING DEVICE USING SAME

TECHNICAL FIELD

The present invention relates to a recording medium cutter for cutting a recording medium, which is being moved, in the moving direction thereof in an image forming device for forming an image on the recording medium, such as recording paper, and also relates to an image forming device using the recording medium cutter.

BACKGROUND ART

Among the output devices for computers and workstations, an ink jet image forming device that ejects ink drops and forms an image on a recording paper sheet moved in a predetermined moving direction and an electrophotographic image forming device that forms an image with toner are known. In those image forming devices, the area of a large-size paper sheet is sometimes divided into half or quarter segments to efficiently arrange smaller-size images in the divided areas to thereby make waste-free use of the large-size paper sheet. In such cases, normally, after images are formed, the paper sheet is cut into the segments of the areas.

In cutting a paper sheet, there are two methods with regard to the cutting direction thereof: one is a Y-cutting (also called transverse cutting) method to cut a paper sheet in a direction perpendicular to the sheet moving direction, and the other is an X-cutting (also called longitudinal cutting) method to cut a paper Sheet in the same direction as the sheet moving direction. The X-cutting method is useful for cutting out smaller-size segments from a wide-width paper sheet or cutting the paper sheet into two half segments.

Moreover, there are manual cutting and automatic cutting for cutting a paper sheet, the latter being performed automatically in the image forming device. In the automatic cutting, when the Y-cutting method is used, after images have been formed, a Y-cutting means (a blade or blades), which is placed in position, is made to traverse in a direction perpendicular to the sheet moving direction to perform a transverse cutting. On the other hand, when the X-cutting is used, before images are formed an X-cutting means (a blade or blades) is moved and set at a cutting position in advance, and then a longitudinal cutting of the paper sheet is performed by utilizing the power of moving the paper sheet in the image formation process.

An X-cutting unit for cutting a paper sheet in the moving direction of the paper sheet is generally equipped with two disc blades, which rotate in contact with the paper sheet to cut the same.

As an example of such X-cutting unit, a connect-disconnect type cutting unit is known which has two blades such that when no X-cutting is necessary the blades are set apart to opposite positions across a paper sheet, and when the paper sheet is to be cut they are moved vertically to the positions where they come into contact with the paper sheet to cut the same.

A shift type cutting unit is also known which has two disc blades, which are in contact with each other with their mutual positional relationship kept fixed, and which are placed in a standby position in the sheet width direction away from the sheet moving path, so as not to obstruct the moving of the paper sheet. When a paper sheet is to be cut, the cutting unit is shifted from the standby position to a cutting position to cut the paper sheet.

When two such opposing blades are used for cutting, if the gap between the blades is not adequate, the cutting unit is unable to exhibit a desired cutting performance. It is known that if the gap is too wide, no cutting is achieved or the cutting section becomes unclean.

Out of the above-mentioned conventional X-cutting units, in the connect-disconnect type X-cutting unit, when the two blades are moved up or down to a position where they contact a paper sheet for cutting the same, it is difficult to adjust the positions of the two blades that are separately configured. Because of this, there may be possibilities that the two blades are not positioned a desired distance apart, and the paper sheet cannot be cut at a correct cutting position, or cannot be cut straight.

On the other hand, in the above-mentioned shift type cutting unit, the gap between the two blades can be assured, but it takes time for the X-cutting unit to be shifted to the cutting position, with the result that a long time is required before cutting. The time for shifting the cutting unit to reach the cutting position is a greater problem for a larger-size paper sheet with a broader width.

Meanwhile, Japanese Patent Publication (KOKOKU) No. Hei4-55878 (Japanese Patent Application Laid-Open (KOKAI) No. 59-164192) discloses an X-cutting unit for cutting a paper sheet in the sheet moving direction, in which one rotary blade is supported at one end of an arm, and when a paper sheet is to be cut, the rotary blade is pivoted about the other end of the arm to bring the rotary blade into contact with the paper sheet. Because this X-cutting unit is a kind of the connect-disconnect type, although there is no problem of time for the shifting, there may be a problem that the use of one cutting blade does not necessarily bring about good cutting results of the paper sheet. In addition, to drive the rotary blade and the pivotable arm independently of each other, separate drive sources (motors) are used. This results in the complexity in its structure and a high cost of the device.

Also, if a space for movement of the X-cutting unit is provided across the sheet moving path, along which a recording medium is moved, in order to change the cutting position, and if the X-cutting unit is moved in that space in a direction perpendicular to the sheet moving direction, there may be a possibility that the recording medium being moved is caught at a border portion between the space and the main body of the image forming device.

Incidentally, the cutting position in the automatic cutting is normally decided according to information about a cutout size of a paper sheet.

In the X-cutting by which to cut a paper sheet in the same direction as the sheet moving direction, there has been a problem as follows in deciding the cutting position.

Even if the cutting means is located at a fixed position previously decided according to a standard size of paper sheet to be cut out, the actual edge positions of the cut-out paper sheet are not necessarily constant because of errors in edge positions (left and right edges) of a paper sheet that has been set to be cut. As a result, there are likely to be variations in the width of the paper sheets cut out by the X-cutting means which has been set at a fixed position in a direction (sheet width direction) perpendicular to the sheet moving direction.

Some users have been desired that it should be made possible to cut a roll paper sheet or a large-size cut-sheet in accordance with the size of an image formed on the paper sheet. A possible solution to this is to manually move the X-cutting means to an estimated longitudinal cutting position based on the size of a formed image. However, large errors could occur in estimating the sizes of individual images formed on the paper sheet and manually setting the longitudinal cutting positions. It sometimes happens that the margins around an image are too large or too small.

When one wishes to make better use of recording paper by forming a plurality of images (two for example) across the width of a roll paper sheet or a large cut-sheet, it is desirable to cut the paper sheet into equal widths of segments. In such a case, there has been a problem that because the X-cutting means is set at a previously decided fixed position, as mentioned above, errors could occur due to the tolerances in paper sheet position, resulting in a low accuracy of cutting.

In view of the above-mentioned circumstances, an object of the present invention is to provide a recording medium cutter which uses two blades for the X-cutting unit, reduces time for cutting, assures that the gap between the two blades is kept at a desired value, and can perform longitudinal cutting of a recording medium at an accurate position.

A second object of the present invention is to provide a recording medium cutter which do not hamper the smooth moving of a recording medium.

A third object of the present invention is to provide an image forming device having a longitudinal cutting unit which automatically cuts a recording paper sheet, and can decide a cutting position with high accuracy.

DISCLOSURE OF INVENTION

According to the present invention, there is provided a recording medium cutter for use in an image forming device for forming an image on a recording medium moved to an image forming area, the cutter being located downstream of the image forming area in the recording medium moving direction, for cutting the recording medium being moved, the recording medium cutter comprising:

- a rotary blade for cutting, while rotating, a recording medium in the moving direction thereof;
- a driven blade driven by the rotary blade for cutting, while rotating, the recording medium in the moving direction thereof, in cooperation with the rotary blade;
- blade holding means rotatable about a center axis of the rotary blade while rotatably holding the rotary and driven blades with a positional relationship between the two blades kept fixed; and
- rotating means for rotating the blade holding means between a cutting position where the recording medium is cut and a non-cutting position where the recording medium is not cut. With this configuration, since the rotary and driven blades are positioned either in the cutting position or in the non-cutting position, the blades can be moved quickly from the non-cutting position to the cutting position, so that the time for cutting can be reduced.

Also, because the rotary and driven blades are held with their positional relationship kept fixed, the gap between the two blades can be kept fixed at a desired value, for which reason the recording medium can be cut cleanly at a correct position.

Preferably, the blade holding means includes a guide portion for guiding the recording medium when the driven blade is located at the non-cutting position. Therefore, notwithstanding the presence of the recording medium cutter, the recording medium is guided smoothly.

Preferably, the rotating means includes a single drive means for rotating the rotary blade and the blade holding means as well. In this case, the rotating means continues to rotate the rotary blade still after the blade holding means has reached the cutting position and has stopped rotating. The use of such rotating means as a common drive for the rotary blade and the blade holding means will save the required space in the device and the cost thereof.

Preferably, the rotary and driven blades respectively have center axes substantially parallel with each other, and the rotary and driven blades are pressed against each other on their side faces. With this arrangement, a segment of the medium on the rotary blade side and another segment of the medium on the driven blade side, both being cut off from a recording medium, will move in opposite directions, so that a tensile force is applied to that portion of the paper sheet being cut, and hence, the recording medium is readily cut.

The rotation of the blade holding means can be realized by the driven blade which revolves around the rotary blade as the rotary blade rotates on its axis. The recording medium cutter has first and second stopping means for stopping the rotation of the blade holding means respectively at the cutting and non-cutting positions.

Means for moving the blade holding means in a direction perpendicular to the recording medium moving direction may be provided. With this arrangement, a recording medium can be cut at an optional position in the direction perpendicular to the recording medium moving direction.

Moreover, a recording medium cutter may further comprise recording medium dividing and guiding means for guiding, out of a pair of segments of the medium cut out by the rotary and driven blades, a segment of the medium on the rotary blade side relative to a cutting point, where the rotary and driven blades come into contact with the recording medium, in a direction of going away from the center axis of the rotary blade and also guiding a segment of the medium on the driven blade side relative to the cutting point in a direction of going away from the center axis of the driven blade, the recording medium dividing and guiding means being located downstream of the cutting point in the recording medium moving direction. This will cause the segment of the medium on the rotary blade side relative to the cutting point and the segment of the medium on the driven blade side relative to the cutting point to be guided in mutually opposite directions, so that a tensile force is applied to that portion of the recording medium which is going to be cut, and therefore the recording medium is cut more easily and moved smoothly.

One of the first and second stopping means may serve also as position-detecting means for detecting a rotational position of the blade holding means.

When the recording medium cutter further includes an ejection guide plate for guiding the recording medium moving in a sheet ejecting direction, the ejection guide plate having formed therein an opening for the blade holding means to move through in a direction perpendicular to the recording medium moving direction, the recording medium cutter preferably includes a recording medium moving plate which is capable of closing that area in the opening for movement other than the area occupied by the blade holding means and which is also movable with the movement of the blade holding means. The ejection guide plate's opening for the cutter movement comes to be closed by the recording medium moving plate as the blade holding means moves, and therefore the recording medium can be moved smoothly.

According to the present invention, there is provided an image forming device for forming an image on a recording paper sheet on the basis of image data while moving the paper sheet to an image forming section, the image forming device comprising:

- paper sheet side edge detecting means for detecting the position of at least one of two side edges of the paper sheet which are parallel with a paper sheet moving direction;
- transverse cutting means for cutting the paper sheet in a direction perpendicular to the paper sheet moving direction;

longitudinal cutting means for cutting the paper sheet in the same direction as the paper sheet moving direction by utilizing the moving power of the paper sheet, the longitudinal cutting means being mounted movably in a direction perpendicular to the paper sheet moving direction;

longitudinal cutting control means for moving and setting the longitudinal cutting means at a longitudinal cutting position;

image area detection means for obtaining information about an area of an image based on the image data;

transverse cutting-position deciding means for deciding a transverse cutting position according to image area information obtained by the image area detection means; and longitudinal cutting-position deciding means for deciding a longitudinal cutting position according to information about paper sheet side edge detected by the paper sheet side edge detecting means and the image area information;

wherein the longitudinal cutting control means moves and sets the longitudinal cutting means at a longitudinal cutting position decided by the longitudinal cutting-position deciding means.

The image forming section mentioned above is means for putting some color dots on a recording paper sheet. For example, it is an ink head or a carriage in the ink jet recording system. Alternatively, it is a thermal head in the thermosensitive recording system or in the thermal transfer recording system. At least one of two side edges of a recording paper sheet denotes the side edge on the side used as a reference position when an image is formed on a paper sheet before cutting. With this configuration, longitudinal and transverse cutting positions can be decided according to an image area when image data includes an image having an area of a various size.

In this image forming device, preferably, the transverse cutting-position deciding means may take into account a top margin and a bottom margin for the image, which have been set before the formation of the image, in making a decision on the transverse cutting position, and the longitudinal cutting-position deciding means may take into account a left margin and a right margin for the image, which have been set before the formation of the image, in making a decision on the longitudinal cutting position. With this arrangement, adequate margins can be given to individual images.

A second image forming device according to the present invention is designed to form an image on a recording paper sheet on the basis of image data while moving the paper sheet to an image forming section. The second image forming device comprises:

paper sheet side edge detecting means for detecting the positions of two side edges of the paper sheet which are parallel with the paper sheet moving direction;

longitudinal cutting means for cutting the paper sheet in the same direction as a paper sheet moving direction by utilizing the moving power of the paper sheet, the longitudinal cutting means being mounted movably in a direction perpendicular to the paper sheet moving direction;

longitudinal cutting control means for moving and setting the longitudinal cutting means at a longitudinal cutting position; and longitudinal cutting-position deciding means for deciding a longitudinal cutting position according to positional information about the two side edges of the paper sheet, obtained by the paper sheet side edge detecting means;

wherein the longitudinal cutting control means moves and sets the longitudinal cutting means at a longitudinal cutting position decided by the longitudinal cutting-position deciding means.

With this configuration, an appropriate position decided according to the width of a recording paper sheet used (an equally divided position, for example) can be set as the longitudinal cutting position with high accuracy.

A third image forming device according to the present invention is designed to form an image on a recording paper sheet on the basis of image data while moving the paper sheet to an image forming section. The third image forming device comprises:

paper sheet side edge detecting means for detecting the position of at least one of two side edges of the paper sheet which are parallel with a paper sheet moving direction;

transverse cutting means for cutting the paper sheet in a direction perpendicular to the paper sheet moving direction;

longitudinal cutting means for cutting the paper sheet in the same direction as the paper sheet moving direction by utilizing the moving power of the paper sheet, the longitudinal cutting means being mounted movably in a direction perpendicular to the paper sheet moving direction;

longitudinal cutting control means for moving and setting the longitudinal cutting means at a longitudinal cutting position;

size checking means for checking whether a paper sheet size specified for the image data is one of a plurality of standard paper sheet sizes;

table means having defined information about longitudinal and transverse cutting positions corresponding to the plurality of standard paper sheet sizes;

transverse cutting-position deciding means for obtaining information about a transverse cutting position by referring to the table means according to the standard size checked by the size checking means, and deciding a transverse cutting position according to the information about the transverse cutting position; and longitudinal cutting-position deciding means for obtaining information about a longitudinal cutting position by referring to the table means according to the standard size checked by the size checking means, and deciding a longitudinal cutting position according to the information about longitudinal position and information about the paper sheet side edge detected by the paper sheet side edge detecting means;

wherein the longitudinal cutting control means moves and sets the longitudinal cutting means at a longitudinal cutting position decided by the longitudinal cutting-position deciding means.

With this configuration, standard sizes of paper sheet can be cut out of a roll paper sheet or a large-size cut-sheet.

A fourth image forming device according to the present invention is designed to form an image on a recording paper sheet on the basis of image data while moving the paper sheet to an image forming section. The forth image forming device comprises:

transverse cutting means for cutting the paper sheet in a direction perpendicular to a paper sheet moving direction;

longitudinal cutting means for cutting the paper sheet in the same direction as the paper sheet moving direction by utilizing the moving power of the paper sheet, the longitudinal cutting means being mounted movably in a direction perpendicular to the paper sheet moving direction;

image area detection means for obtaining information about an area of an image based on the image data;

paper sheet side edge detecting means for detecting the positions of two side edges of the paper sheet which are parallel with the paper sheet moving direction;

size checking means for checking whether a paper sheet size specified for the image data is any one of a plurality of standard paper sheet sizes; and cutting-position deciding method selecting means for selecting any of a first cutting-position deciding method for deciding a longitudinal cutting position and a transverse cutting position according to image area information obtained by the image area detection means, a second cutting-position deciding method for deciding a longitudinal cutting position according to information about both side edges of the paper sheet obtained by the paper sheet side edge detecting means, and a third cutting-position deciding method for deciding a longitudinal cutting position and a transverse cutting position according to information about the standard paper sheet size obtained by the size checking means.

With this configuration, it becomes possible to selectively adopt a desired cutting method to meet the user's request.

Note that when the second cutting-position deciding method is selected, any optional method for deciding a transverse cutting position can be selected.

In the respective image forming devices, the above-mentioned longitudinal cutting means can be located at a position decided by the longitudinal cutting-position deciding means during the image forming process, and a paper sheet can be cut in a longitudinal direction by utilizing the moving power of the paper sheet.

BRIEF DESCRIPTION OF THE DRAWINGS

FIG. 22 is an explanatory diagram of a paper sheet size table using the cutting-position deciding method dependent on a specified paper sheet size of FIG. 15.

BEST MODE FOR CARRYING OUT THE INVENTION

With reference to the accompanying drawings, description will be made of the preferred embodiments of the image forming device and the recording medium cutter according to the present invention.

Figure 1:
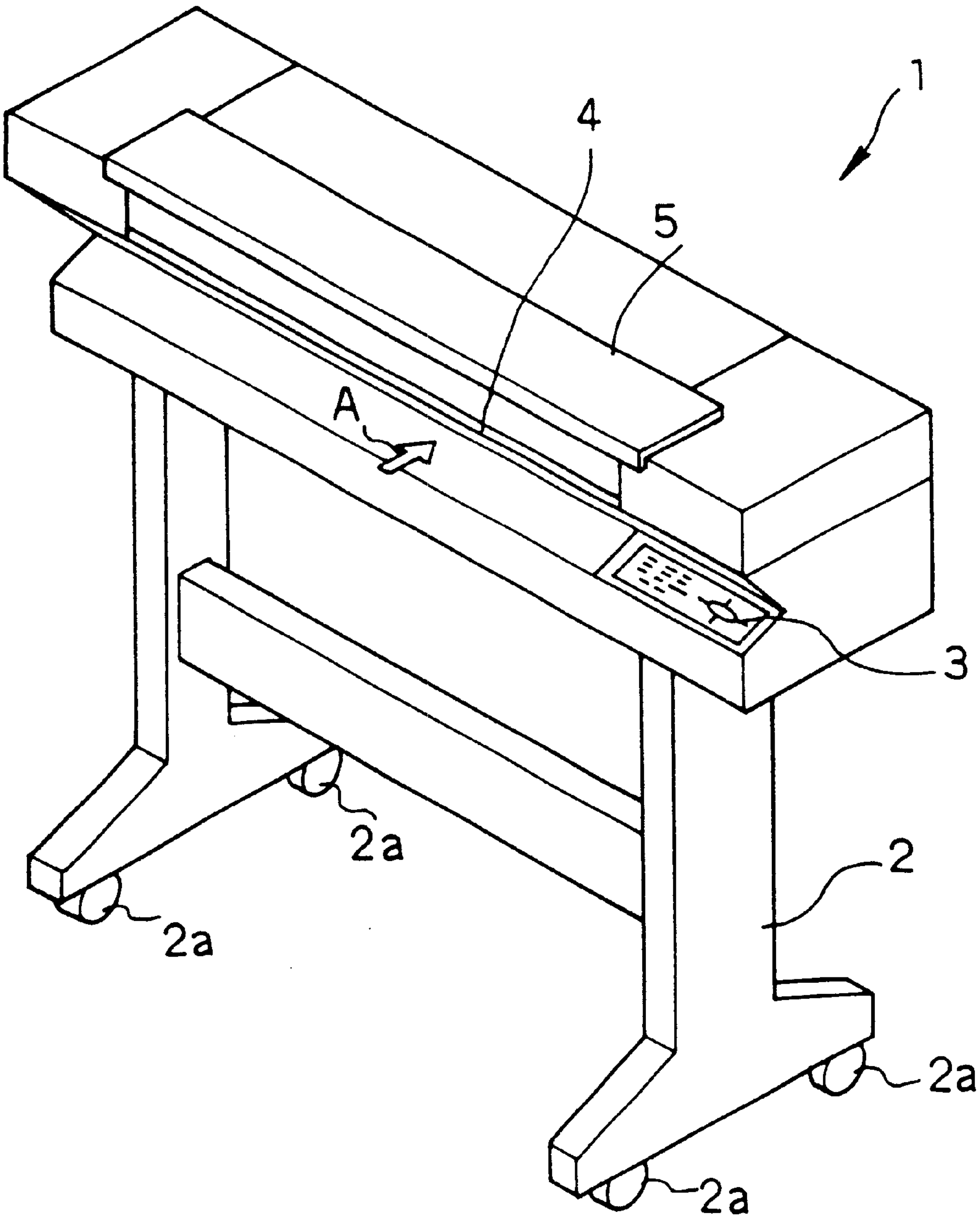
FIG. 1 is a perspective view showing a general configuration of a color plotter as an example of the image forming device according to the present invention.

FIG. 1 shows the general configuration of an ink jet type color plotter (hereafter referred to simply as a plotter) to give an example of an image forming device to which the present invention is applied. Note that the image forming device according to the present invention is not limited to the ink jet type nor to the plotter. It should be sufficient if the image forming device has at least a function of cutting a paper sheet in the same direction as the paper sheet moving direction.

A plotter 1 is fixed on a stand 2 fitted with casters 2*a*. The plotter 1 has an operation panel 3 for operation by a user. This operation panel 3 has various switches or the like thereon, which are used for the user to input commands or specify the type of recording paper, online/offline, and so on. A paper sheet inserted into a paper sheet insertion slot 4 is fed into the plotter 1, and a color image is printed on the paper sheet on the basis of data from a computer or the like external to the plotter 1. A printed paper sheet is ejected from an ejection port at an upper front position of the plotter 1. The plotter 1 has a cover 5 to enclose its interior.

Figure 2:
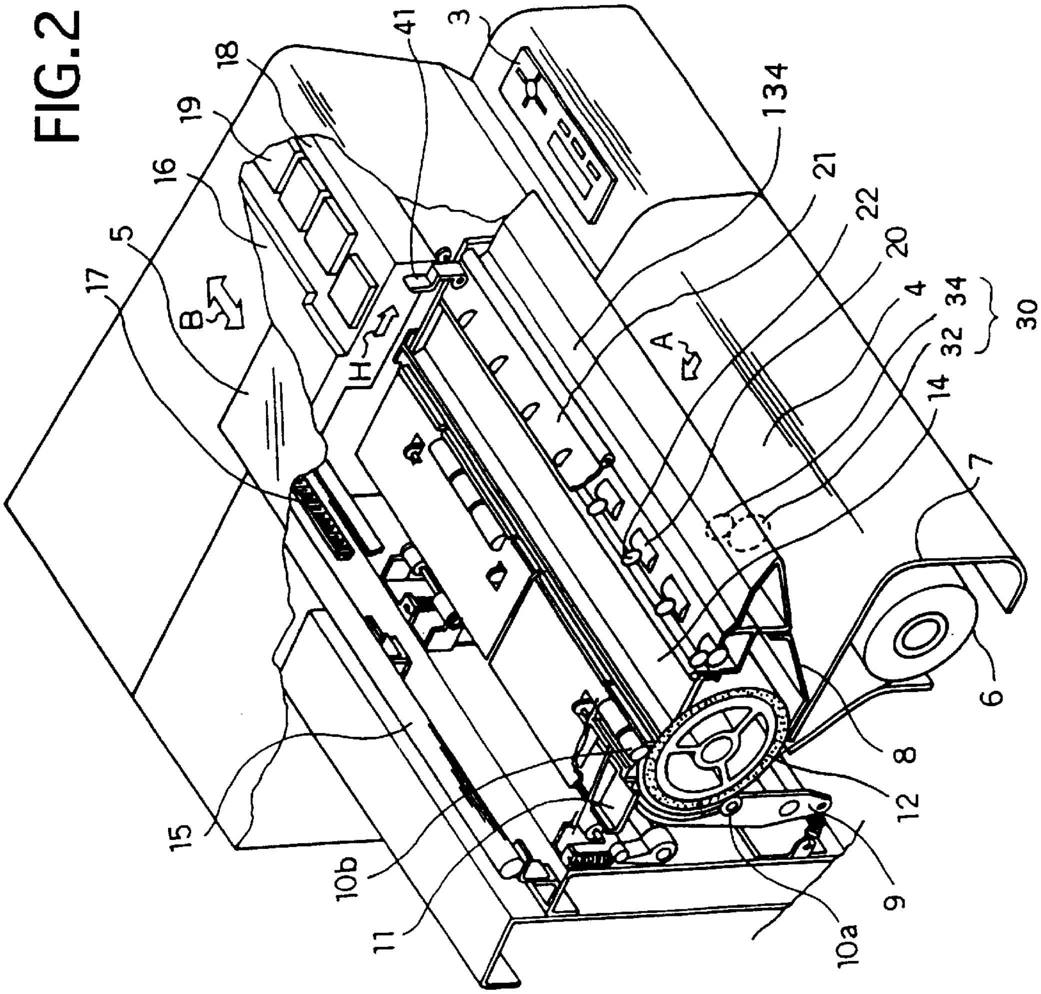
FIG. 2 shows the path from insertion to ejection of a paper sheet by a partially cutaway view in perspective of the color plotter in FIG. 1.

Referring to FIG. 2, the moving path of the paper sheet and the printing (image forming) process will be described.

FIG. 2 is a perspective view of the plotter 1, partly broken away to show the path from insertion to ejection of the paper sheet.

The plotter 1 can print on both a cut-sheet inserted from the paper sheet insertion slot 4 and a roll of paper sheet 6 loaded in it. Description will be made of a cut-sheet inserted through the paper sheet insertion slot 4. The description applies also to a roll of paper sheet, excepting that a roll of paper sheet is loaded in a different manner.

A paper sheet (a large-size cut-sheet, for example) is placed in position on the cover 7 and inserted into the insertion slot 4 in the direction of arrow A. The inserted paper sheet passes between the cover 7 and an upper guide 8, and is moved onto a print board 14 while being held between a sheet moving roller 10*a* rotatably supported by a lower moving roller support plate 9 and a sheet moving roller 10*b* rotatably supported by an upper moving roller support plate 11. The paper sheet that has passed the upper surface of the print board 14 is then held by an ejection roller 20 and spurs 22 located above the ejection roller 20, and ejected. The spurs 22 are rotatably supported on a spur plate 21.

The plotter 1 also includes a carriage 16, which reciprocates in the direction of arrow B, and the carriage 16 includes a head holder 18. A plurality of print heads 19 respectively containing different colors of ink (e.g., cyan blue, magenta, yellow and black) are mounted on the carriage 16. The carriage 16 is fixed to a belt 17 which is driven by a driving motor, not shown, and reciprocates in the direction of arrow B by normal and reverse rotation of the driving motor. As the belt 17 runs back and forth in the direction of arrow B, the carriage 16 also reciprocates in the direction of arrow B guided by a guide rail 15.

A recording medium cutter 30 (refer to FIG. 3), which will be described later, is located downstream of the image forming area in the moving direction of a paper sheet (in a direction perpendicular to the direction of arrow B, in other words, in the sheet moving direction in the present invention). FIG. 2 indicates the locations of the rotary blade 32 and the driven blade 34 in a hollow space under an ejection guide plate 134.

The paper sheet is moved intermittently in a direction perpendicular to the direction of arrow B. To form an image on a paper sheet, the paper sheet is stopped temporarily, and while the carriage 16 is made to reciprocate in the direction of arrow B, ink drops are ejected onto the area of the paper sheet that corresponds to an image forming area on the basis of image information supplied to the print heads 19. In this way, an image for one band (in a strip shape) is formed. After this, the paper sheet is moved for a predetermined length, and an image for the next band is formed in an blank area of the image forming area. This action is repeated for the full length of the paper sheet, and thus a color image is formed on the paper sheet. The paper sheet on which a color image has been formed is held between the ejection roller 20 and the spurs 22 and ejected over the ejection guide plate 134.

Referring now to FIGS. 3 to 6, the configuration and the operation of the recording medium cutter will be described in detail.

Figure 3:
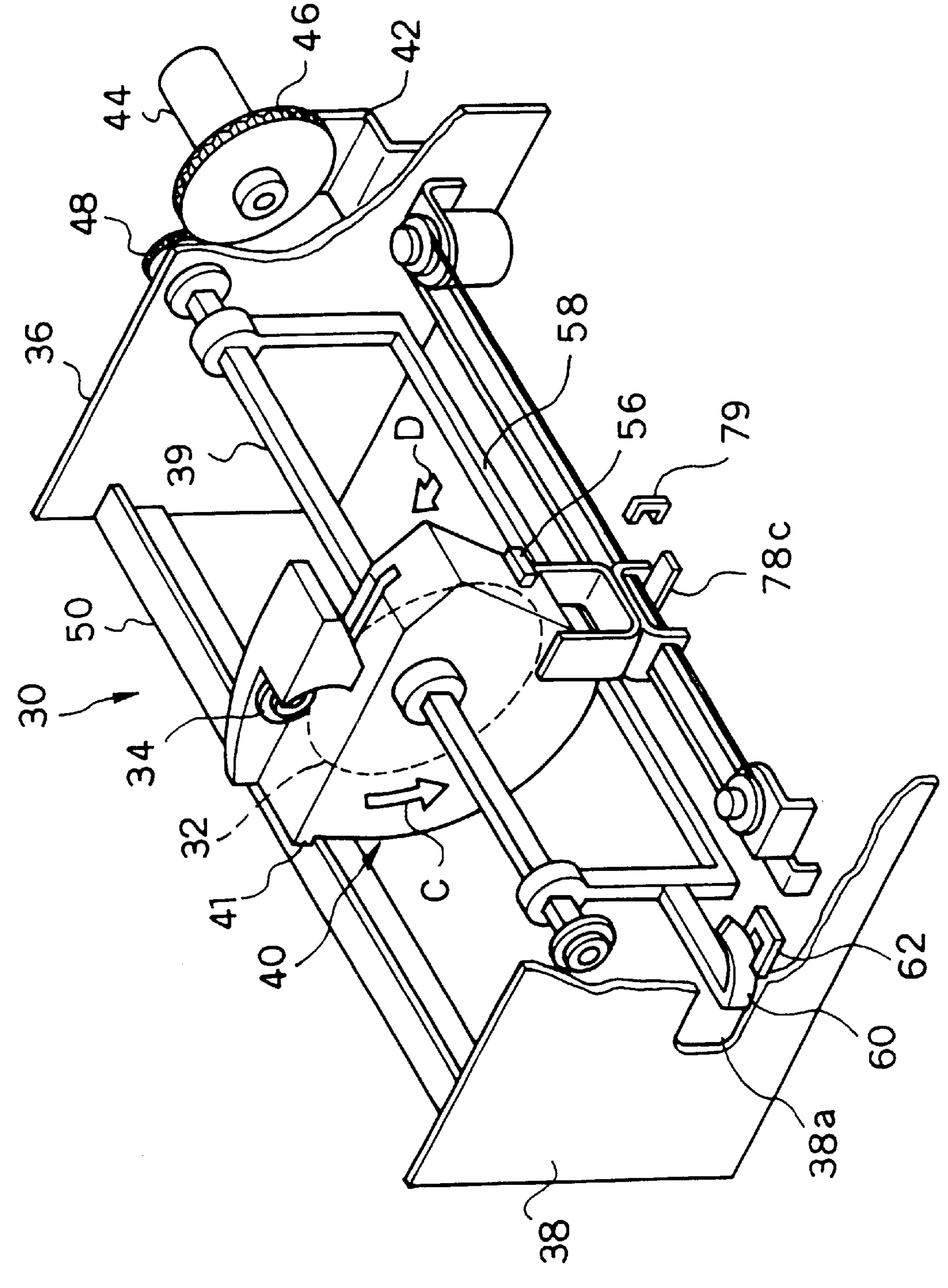
FIG. 3 is a perspective view showing the recording medium cutter when the rotary and driven blades are located at the cutting position.
Figure 4A:
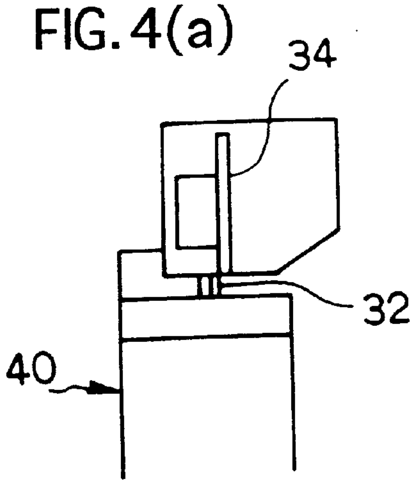
FIGS. 4(*a*)–(*d*) show the arrangements of the rotary and driven blades of the recording medium cutter in FIG. 3 where FIG. 4(*a*) is a front view, FIG. 4(*b*) is a right side view, FIG. 4(*c*) is a rear side view, and FIG. 4(*d*) is a left side view.
Figure 4B:
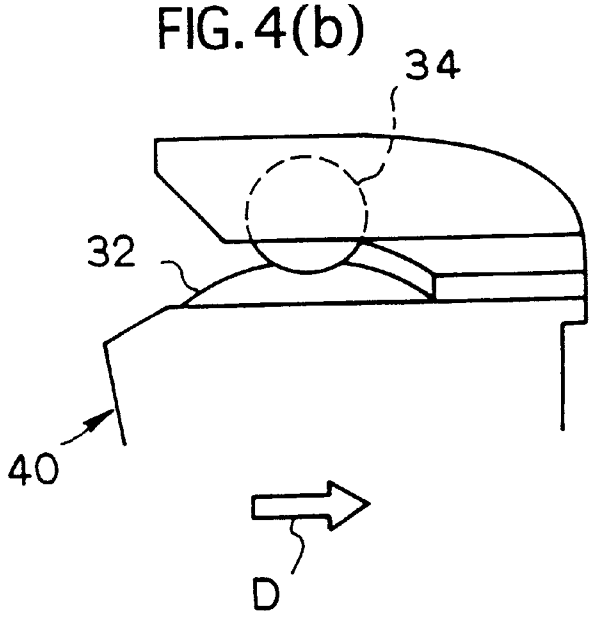
Figure 4C:
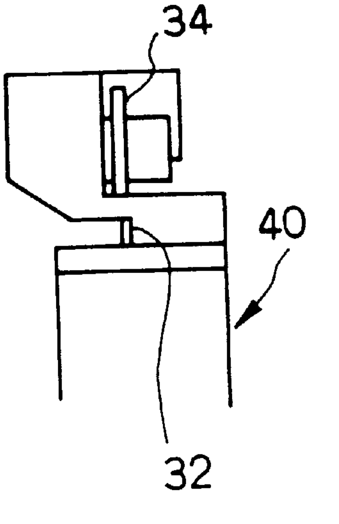
Figure 4D:
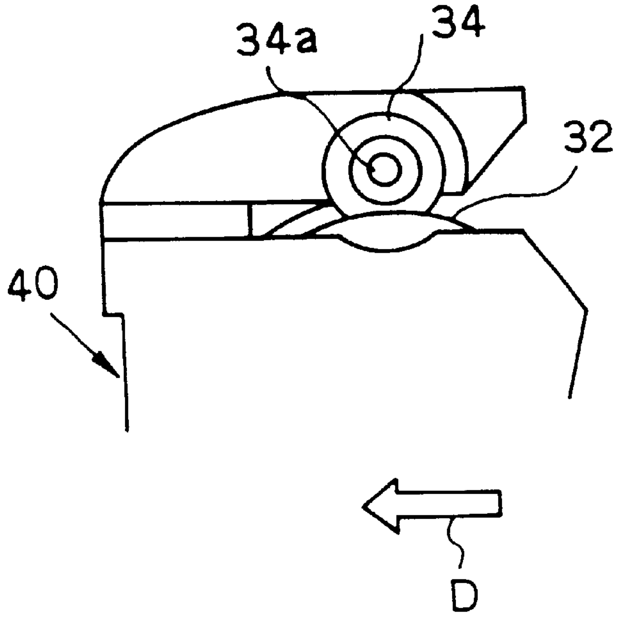

FIG. 3 shows the recording medium cutter 30 when the rotary and driven blades are located at the cutting position where those blades can cut a paper sheet (in a first condition). Note that this view is taken from the upstream side of the sheet moving direction, which is opposite from the viewpoint in FIG. 2.

As mentioned above, the recording medium cutter 30 is located downstream of the image forming area in the sheet moving direction, in other words, the cutter is located downstream of the ejection roller 20 and the spurs 22. While held between the ejection roller 20 and the spurs 22, the paper sheet is moved toward the paper sheet cutter 30 and cut. As described above, the recording medium cutter 30 is mounted inside the ejection guide plate 134 (refer to FIG. 3) and the size of side plates 36 and 38 is, in fact, not more than 40 mm by 30 mm, but the device is depicted on a larger scale for convenience of explanation.

The recording medium cutter 30 has the side plates 36, 38 installed facing each other. The main body 40 (an example of what is called the holding means in the present invention) of the recording medium cutter is located between the side places 36, 38. The main body 40 rotatably holds the rotary blade 32 and the driven blade 34 with their positional relationship kept fixed. A main shaft 39 serving as the center axis of the rotary blade 32 is held rotatably between the side plates 36, 38. This main shaft 39 serves also as the rotating shaft of the main body 40. A mounting plate 42 is fixed to the side plate 36, and a driving motor (an example of what is called the rotating means in the present invention) is fixed to the mounting plate 42. A motor gear 46 is fixed to the rotating shaft of the driving motor 44. The motor gear 46 is engaged with the main shaft gear 48 fixed to the main shaft 39, and the main shaft 39 rotates as the driving motor 44 rotates. The rotary blade 32 is held in such a way as to be rotatable by the rotation of the main shaft 39 and also slidable along the main shaft 39 in the axial direction. On the other hand, the main body 40 is structured such that the main shaft 39 slidably runs through the center portion of the main body 40 and that the turning force of the main shaft 39 is not directly transmitted to the main body 40. The rotary blade 32 and the driven blade 34 have their edge portions in face-to-face contact, with a predetermined pressure exerted against each other.

When the main shaft 39 rotates in the direction of arrow C (direction of rotation) by the rotation of the driving motor 44, the rotary blade 32 starts to rotate in the direction of arrow C. Due to the contact pressure between the rotary blade 32 and the driven blade 34, the driven blade 34 contacting the rotary blade 32 at one point of the circumference of the rotary blade 32 starts to revolve around the main shaft 39 as the rotary blade 32 rotates. At this time, there is no relative rotation occurring between the two blades as if the driven blade 34 were glued to the rotary blade 32 with an adhesive. Accordingly, the main body 40 supporting the driven blade 34 also rotates around the main shaft 39.

As the main body 40 rotates, a stopper 41 formed on the main body 40 comes into contact with a stop beam 50 extending between the side plates 36, 38. In this embodiment, the stopper 41 and the stop beam 50 constitute a first stopping means. By this arrangement, the main body 40 is prevented from further rotating around the main shaft 39, with the result that the revolution of the driven blade 34 also stops. In this way, the rotary blade 32 and the driven blade 34 come to a stop at the cutting position where those blades cooperate to cut a paper sheet. The condition of the main body 40 at this time (first condition) is the cutting condition. Even after the two blades 32, 34 stop at the predetermined cutting position, the main shaft 39 continues to rotate, driven by the driving motor 44, so that the rotary blade 32 continues to rotate. Consequently, the rotary blade 32 rotates relative to the driven blade 34. When a paper sheet is inserted between the rotary blade 32 and the driven blade 34 and moved in the direction of arrow D, the rotary blade 32 and the driven blade 34 cooperate to cut the paper sheet.

Referring to FIGS. 4(*a*)–(*d*), description will be made of the positional relationship between the rotary blade 32 and the driven blade 34.

FIGS. 4(*a*)–(*d*) show mutual relationship between the rotary blade 32 and the driven blade 34 supported by the main body 40, in which FIG. 4(*a*) is a front view taken from the upstream side in the moving direction of recording medium, FIG. 4(*b*) is a right side view, FIG. 4(*c*) is a rear view, and FIG. 4(*d*) is a left side view. In FIGS. 4(*a*)–(*d*), the same components as in FIG. 3 are designated by the same reference numerals.

The center axis of the rotary blade 32 is the main shaft 39, while the driven blade 34 has the center axis 34*a* substantially parallel with the main shaft 39 located across the cutting point from the driven blade 34. Viewed along the direction of arrow D, the driven blade 34 is located on the right side of the rotary blade 32, and the side faces of those blades are pressed against each other at the cutting point.

Figure 5:
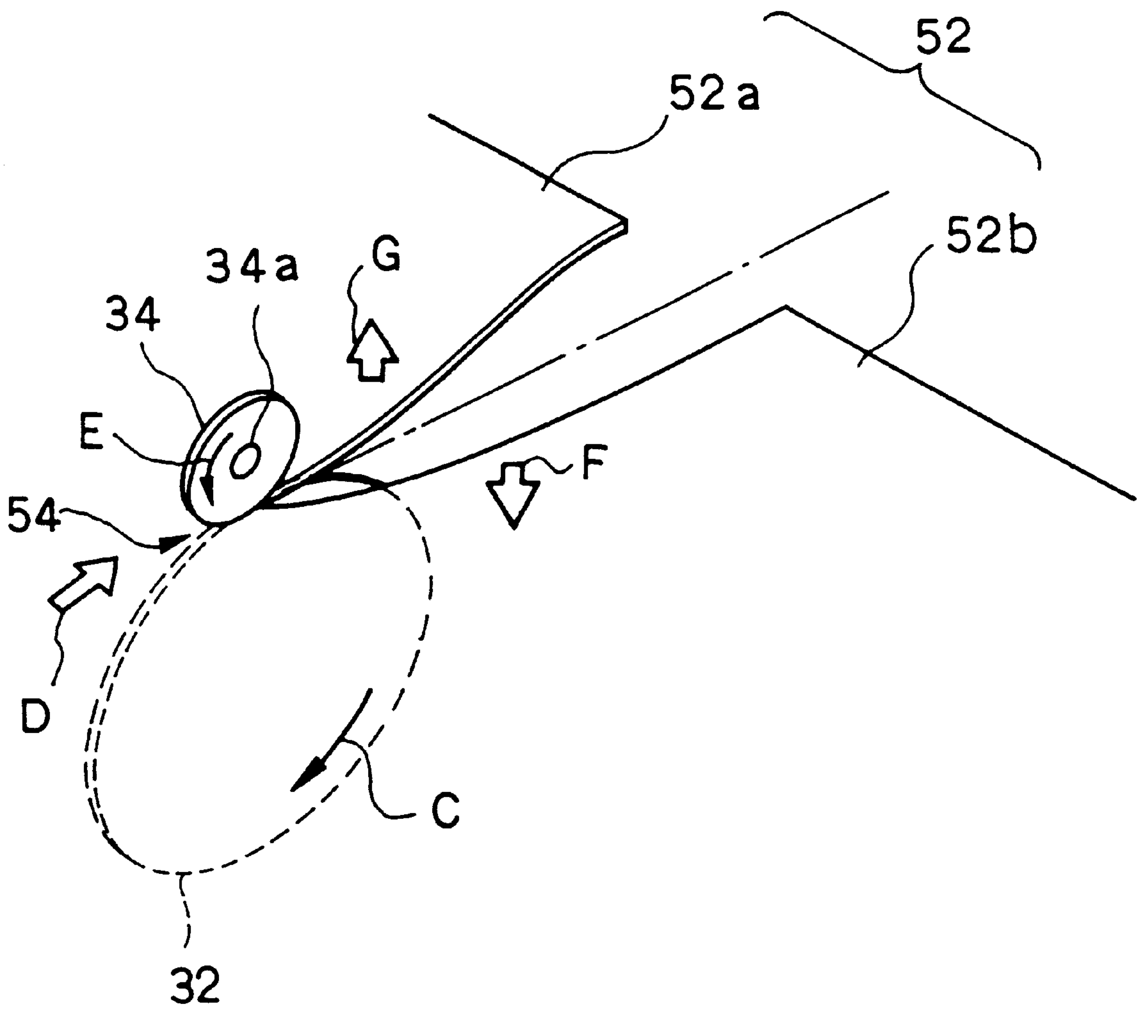
FIG. 5 is a schematic diagram showing the condition when the rotary and driven blades of the recording medium cutter in FIG. 3 cooperate with each other in cutting the paper sheet.

Referring to FIG. 5, how the paper sheet is cut will be described.

FIG. 5 is a schematic diagram showing how the rotary blade cooperates with the driven blade in cutting a paper sheet, in which the same components as in FIG. 3 are designated by the same reference numerals.

The driven blade 34 rotates in the direction of arrow E driven by the rotary blade 32, which rotates in the direction of arrow C, and thus a paper sheet 52 is cut. Viewed along the moving direction, the center axis (the main shaft 39) of the rotary blade 32 is below the cutting point 54, while the center axis 34a of the driven blade 34 is above the cutting point 54. Further, the edge of the rotary blade 32 extends above the cutting point, while the edge of the driven blade 34 extends below the cutting point. For this reason, a segment 52*a* of the paper sheet 52 on the side of the driven blade 34 is pushed down by the driven blade 34 and directed downward (in the direction of arrow F). On the other hand, a segment 52*a* on the rotary blade 32 is pushed up by the rotary blade 32 and directed upward (in the direction of arrow G). In this way, the segments 52*a* and 52*b*, which have been cut out of the paper sheet 52, are separately directed up and down, and hence, the portion of the paper sheet 52 that is going to be cut is subjected to a tensile force, which makes it easy to cut the paper sheet.

Figure 6:
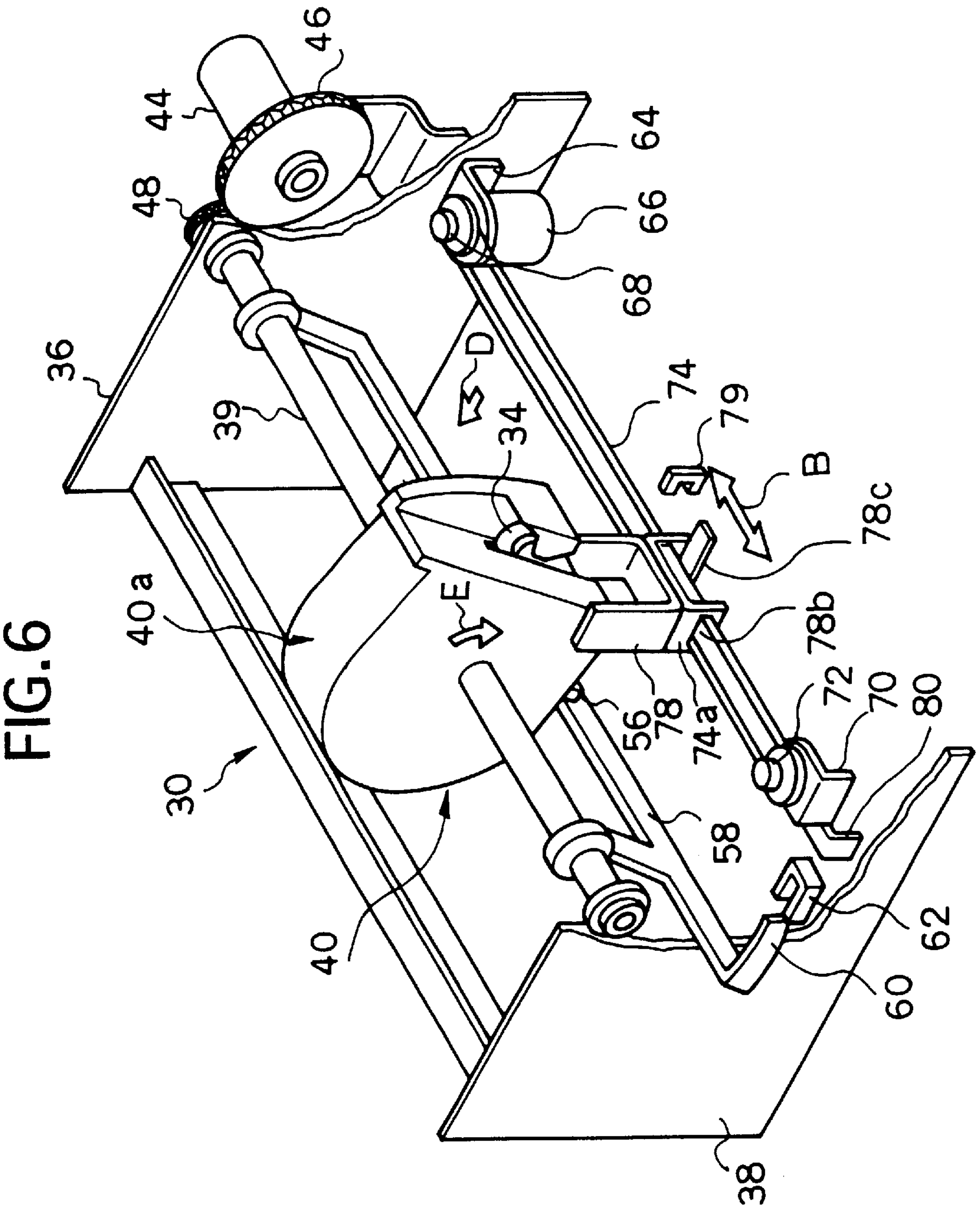
FIG. 6 is a perspective view showing the recording medium cutter when the main body of the recording medium cutter in FIG. 3 is located in the non-cutting position.

Referring to FIG. 6, description will be made of how the main body 40 is changed over from the cutting condition to the non-cutting condition.

FIG. 6 is a perspective view showing the recording medium cutter when the main body 40 is in the non-cutting condition, and the same components as in FIG. 3 are designated by the same reference numerals.

In order to change over the main body 40 from the cutting condition (first condition) to the non-cutting condition (second condition), the driving motor 44 is made to reverse its rotation to rotate the main body 40 in the direction of arrow E. By reversing the driving motor 44, the main shaft 39 also rotates in the direction of arrow E. The main shaft 39 has a lever 58 rotatably attached thereto. A sensor bar 60 that turns on or off a sensor 62 is formed at the left end portion of the lever 58 as viewed from the direction of arrow D. The driving motor 44 is made to rotate or stop in response to on/off of the sensor 62. As shown in FIG. 6, when the sensor bar 60 is disengaged from the sensor 62, the sensor 62 turns off to stop the reverse rotation of the driving motor 44. By making an arrangement such that the rotational position of the main body 40 is detected on the basis of the rotational position of the lever 58, the rotational position of the main body 40 can be detected regardless of the position of the main body 40 in the direction of arrow B (FIG. 6).

In this embodiment, an optical detection means such as a photo interrupter is used as the sensor 62. Alternatively, an arbitrary sensor, such as a mechanical sensor, may be used.

When the main shaft 39 rotates in the direction of arrow E by the reverse rotation of the driving motor 44, the main body 40 also rotates in the direction of arrow E, and consequently a lever hooker 56 provided on the main body 40 engages the lever 58, causing the lever 58 to rotate. Before the lever hooker 56 engages the lever 58, the lever 58 hangs down due to the gravity. As the main body 40 rotates, the lever hooker 56 comes to engage the lever 58, and the lever 58 is rotated by its engagement with the lever hooker 56. However, when the sensor lever 60 has rotated to the position where it is separated from the sensor 62, the lever 58 comes into contact with the extreme end 38*a* of a hole (refer to FIG. 3) of the side plate 38 and is prevented from further rotating. At the same time, in response to the off state of the sensor 62, the driving motor 44 also stops. In this embodiment, the lever 58 and the hole's extreme end 38*a* constitute a second stopping means. As has been described, when the main body 40 stops, it follows that the rotary blade 32 and the driven blade 34 are located at the non-cutting position.

When the rotary blade 32 and the driven blade 34 are located at the non-cutting position, a casing surface 40a (guide portion) of the main body 40 is located at the cutting position where a paper sheet should pass through, so that a paper sheet having moved from the direction of arrow D is guided by the casing surface 40*a* to the sheet ejecting direction. When the casing surface 40*a* is located at the cutting position, the rotary blade 32 and the driven blade 34 are located at the non-cutting position, and therefore those blades do not perform the cutting function. While a paper sheet is moved on the casing surface, the two blades are in the standby position on the reverse side of the paper sheet, for which reason there is no chance of the user touching the blades and getting hurt.

As described above, because the rotary blade 32 and the driven blade 34 are instantaneously rotated between the cutting and non-cutting positions by the rotation of the main body 40, the rotary blade 32 and the driven blade 34 can be moved quickly from the non-cutting position to the cutting position. The main body 40 supports the rotary blade 32 and the driven blade 34 while keeping their mutual positional relationship kept fixed, and furthermore the main body itself can rotate around the main shaft 39. The recording medium cutter is assembled as a single unit. The gap between the rotary blade 32 and the driven blade 34 is assured to be a desired value at all times. As a result, a paper sheet can be cut at a correct position, with each paper sheet segment having a clean cutting section and a straight cutting line. The rotation of the rotary blade 32 and the rotation of the cutter main body up to the cutting position are given by the same motor, so that another motor is not required for the cutter, which contributes to savings in space and cost.

Referring again to FIG. 6, the movement of the main body 40 in the direction of arrow B will be described.

The main body 40 can move in the direction of arrow B at right angles with the sheet moving direction so that a paper sheet cutting position can be selected freely.

A travel motor mounting plate 64 is fixed to the side plate 36, and a motor for travel 66 is mounted to the mounting plate 64. A wire pulley 68 is rotatably secured to the rotating shaft of the travel motor 66. On the other hand, a wire pulley mounting plate 70 is fixed to the side plate 38, and a wire pulley 72 is rotatably secured to the mounting plate 70

A wire 74 is put around the wire pulleys 68, 72. Two ends 74*a*, 74*b* of the wire 74 are fixed to a travelling piece 78. A guide hole 78*b* is formed in the lower portion of the travelling piece 78. A guide rail 80 fixed on each side to the side plates 36, 38 runs through the guide hole 78*b*, and the travelling piece 78 travels along the guide rail 80. Below the travelling piece 78, a sensor bar 78*c* is provided which turns on or off a sensor 79 to decide whether or not to rotate the travel motor 66. The sensor bar 78*c* is formed on a stay (not shown) which extends between and fixed on each side to the side plates 36, 38. In response to on/off of the sensor 79, the travel motor 66 is rotated or stopped. The sensor 79 may have the same structure as the sensor 62.

The travelling piece 78 partially surrounds the main body 40. The travelling piece 78 moves driven by the wire 74, which is pulled by normal and reverse rotations of the travel motor 66. When the travelling piece 78 moves until the sensor 79 turns on, the main body 40 follows the travelling piece. Therefore, the paper sheet cutting position in a direction perpendicular to the sheet moving direction can be selected freely by changing the location or the number of sensor(s) 79. The position change of the recording medium cutter is done in its non-cutting condition. Therefore, the position change is possible anytime regardless of whether a paper sheet is being moved or printing (image formation) is underway, so that it is not necessary to provide an extra time for the position change of the recording medium cutter.

Description will now be made of a case where the cutting position is changed by moving the main body by using the travelling piece 78. The sizes of a paper sheet used as examples are cut-sheets of three sizes: E size (914.4 mm×1219.2 mm), A0 size (841 mm×1189 mm), and B1 size (728 mm×1030 mm).

Assume that on the plotter 1 each paper sheet can be inserted by setting the paper sheet with its longer side to the transverse direction of the plotter 1, and that the reference position is located on one side of the plotter 1. When those paper sheets are cut in half, E size (914.4 mm×1219.2 mm) changes to D size (609.6 mm×914.4 mm), A0 size (841 mm×1189 mm) to A1 size (594 mm×841 mm), and B1 size (728 mm×1030 mm) to B2 size (515 mm×728 mm). Thus, the respective cutting positions are 609.6 mm, 594 mm and 515 mm from the reference position, the difference between the maximum and minimum values being 94.6 mm. Therefore, by configuring the recording medium cutter such that the travelling piece 78 can travel up to a distance of 95.0 mm, it is possible to deal with the cutting of the three kinds of paper sheet. Thus, the travel distance of the travelling piece 78 will be sufficient if it is large enough to cover at least a range of the X-cutting position required for the plotter. The origin of the travel distance of the cutting means of the paper cutter 40 is set so as to have a known positional relationship with the origin for detecting the width (left and right edges) of a paper sheet, which will be described later. By limiting the travel distance of the travelling piece 78 as mentioned above, the recording medium cutter can be made into a single unit as illustrated, allowing it to be handled as one component. However, the present invention is not limited to this configuration, but the width of the recording medium cutter, in other words, the distance from the side plate 38 to the side plate 36 may be as wide as the overall width of paper sheet.

Figure 7:
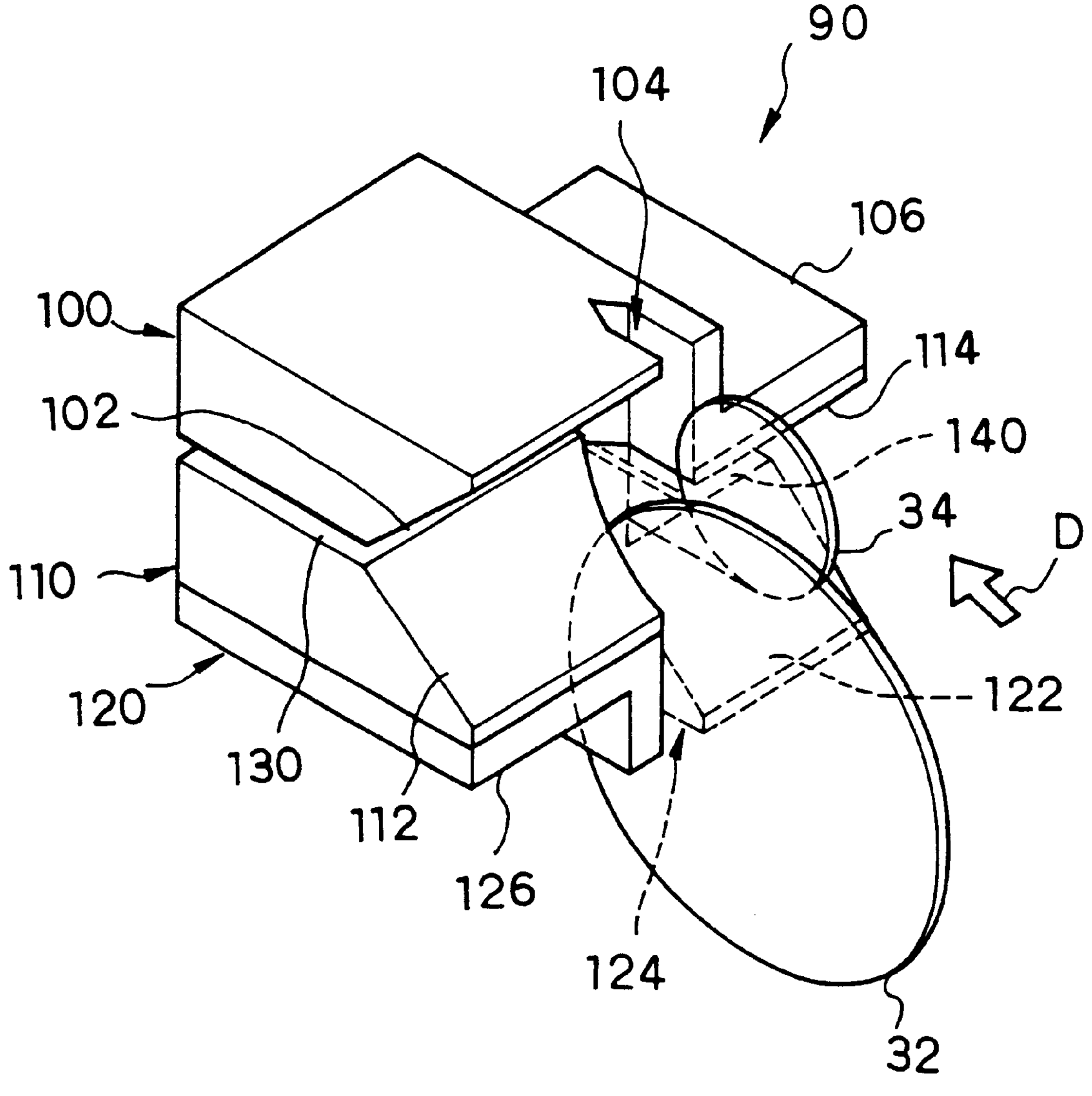
FIG. 7 is a perspective view showing the recording medium dividing and guiding portion of the recording medium cutter in FIG. 3.
Figure 8:
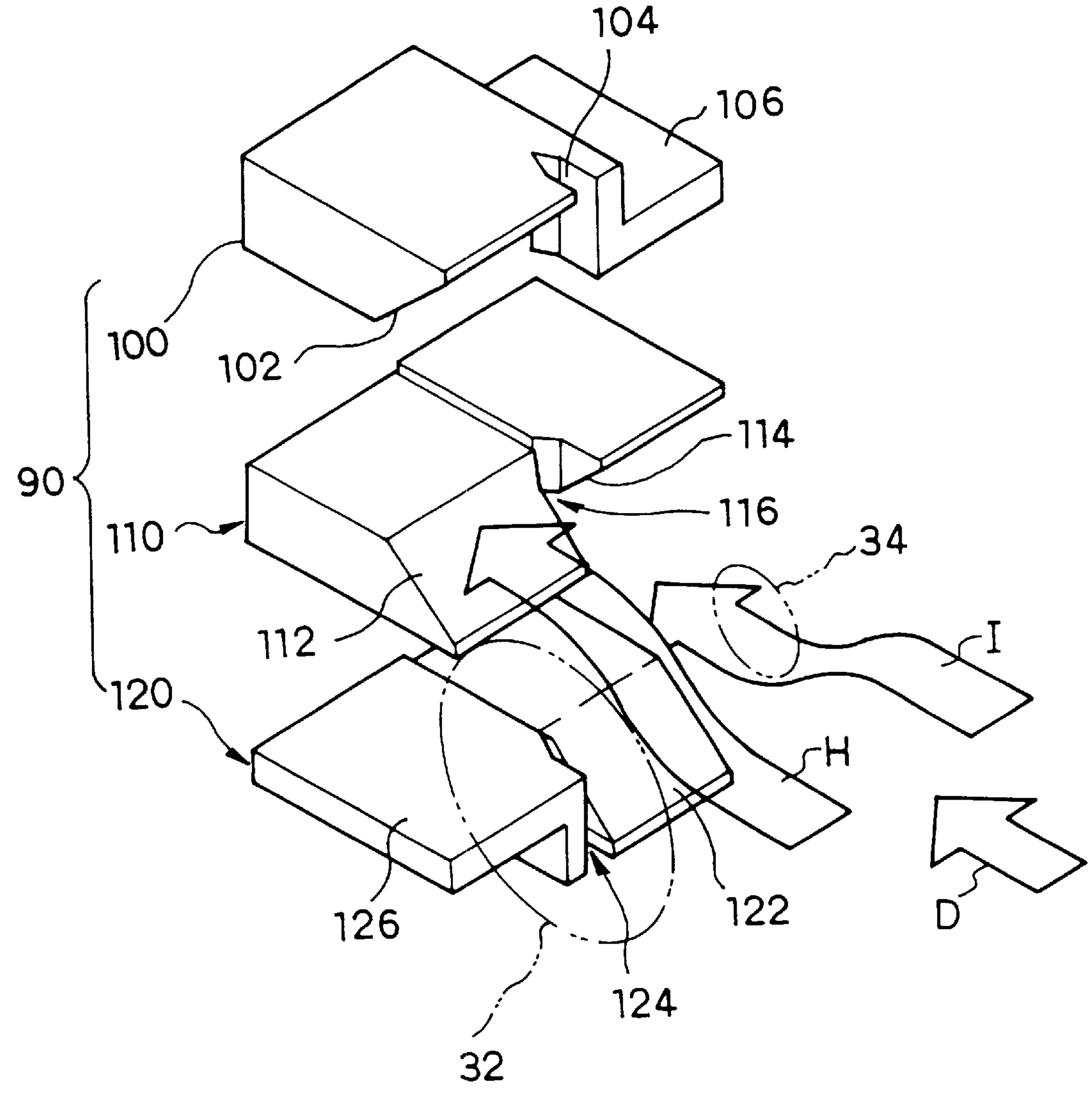
FIG. 8 is an exploded view in perspective of the recording medium dividing and guiding portion of FIG. 7.

Referring to FIGS. 7 and 8, description will move on to the recording medium dividing and guiding member that directs two cut and divided pieces of a paper sheet up and down, one upwards and the other downwards.

FIG. 7 is a perspective view showing the recording medium dividing and guiding member and FIG. 8 is an exploded view in perspective of the recording medium dividing and guiding member.

The recording medium dividing and guiding member 90 is an assembly of an upper guide 100, a middle guide 110, and a lower guide 120, and the assembly is located downstream of the cutting point in the sheet moving direction (in the direction of arrow D).

The upper guide 100 includes a guide surface 102 for guiding upwards, out of a pair of segments of paper sheet, one segment on the side of the rotary blade 32 relative to the cutting point where the rotary blade 32 and the driven blade 34 come into contact with the paper sheet, and also includes a blade relief 104 formed to prevent the rotary blade 32 and the driven blade 34 from contacting the upper guide 100. The upper guide 100 also includes a mounting portion 106 for mounting the middle guide 110.

The middle guide 110 includes a guide surface 112 for guiding upwards the paper sheet segment on the side of the rotary blade 32 relative to the cutting point, a guide surface 114 for guiding downwards another paper sheet segment on the side of the rotary blade 34 relative to the cutting point, and a blade relief 116 for preventing the rotary blade 32 and the driven blade 34 from touching the middle guide 110.

The lower guide 120 includes a guide surface 122 for guiding downwards the paper sheet segment on the side of the driven blade 34 relative to the cutting point, and a blade relief 124 for preventing the rotary blade 32 and the driven blade 34 from contacting the lower guide 120. Further, the lower guide 120 includes a mounting portion 126 for mounting the middle guide 110 to the lower guide 120.

When the middle guide 110 is combined with the upper guide 100, an upper paper sheet passage 130 is formed, through which passes the paper sheet segment on the side of the rotary blade 32 relative to the cutting point. This means that the paper sheet segment on the side of the rotary blade 32 is guided in a direction of going away from the center axis of the rotary blade 32. On the other hand, when the middle guide 110 is mounted on the lower guide 120, a lower paper sheet passage 140 is formed, through which passes a paper sheet segment on the side of the driven blade 34 relative to the cutting point. Therefore, the segment on the side of the driven blade 34 is guided in a direction of going away from the center axis of the driven blade 34.

The paper sheet moved from the direction of arrow D is cut by the rotary blade 32 and the driven blade 34, and the paper sheet segment on the side of the rotary blade 32 relative to the cutting point is guided by the guide surfaces 102, 112 in the direction of arrow H and passes through the upper paper sheet passage 130. On the other hand, the paper sheet segment on the driven blade 34 relative to the cutting point is guided by the guide surfaces 114, 122 in the direction of arrow I and passes through the lower paper sheet passage 140. In this way, the paper sheet segment on the side of the rotary blade relative to the cutting point and the paper sheet segment on the side of the driven blade relative to the cutting point are guided in mutually opposite directions. Therefore, a tensile force acts on the portion that is going to be cut, which makes it easy to cut the paper sheet. Because the paper sheet is cut by the two blades which engage with each other, the leading edge portions of the paper sheet, separated into two segments respectively moving up and down, are guided smoothly. Therefore, the paper sheet is prevented from touching the shafts of the blades or the blade holding member to thereby preclude obstructions to the sheet transportation.

In the above example, the recording medium dividing and guiding member is composed of three components, but may be structured as a monolithic body. After being cut, the paper sheet segments are divided up and down, but at the paper sheet ejection port, the cut segments should preferably be again on the same plane. The reason is that providing a large ejection port is not desirable in design.

Figure 9:
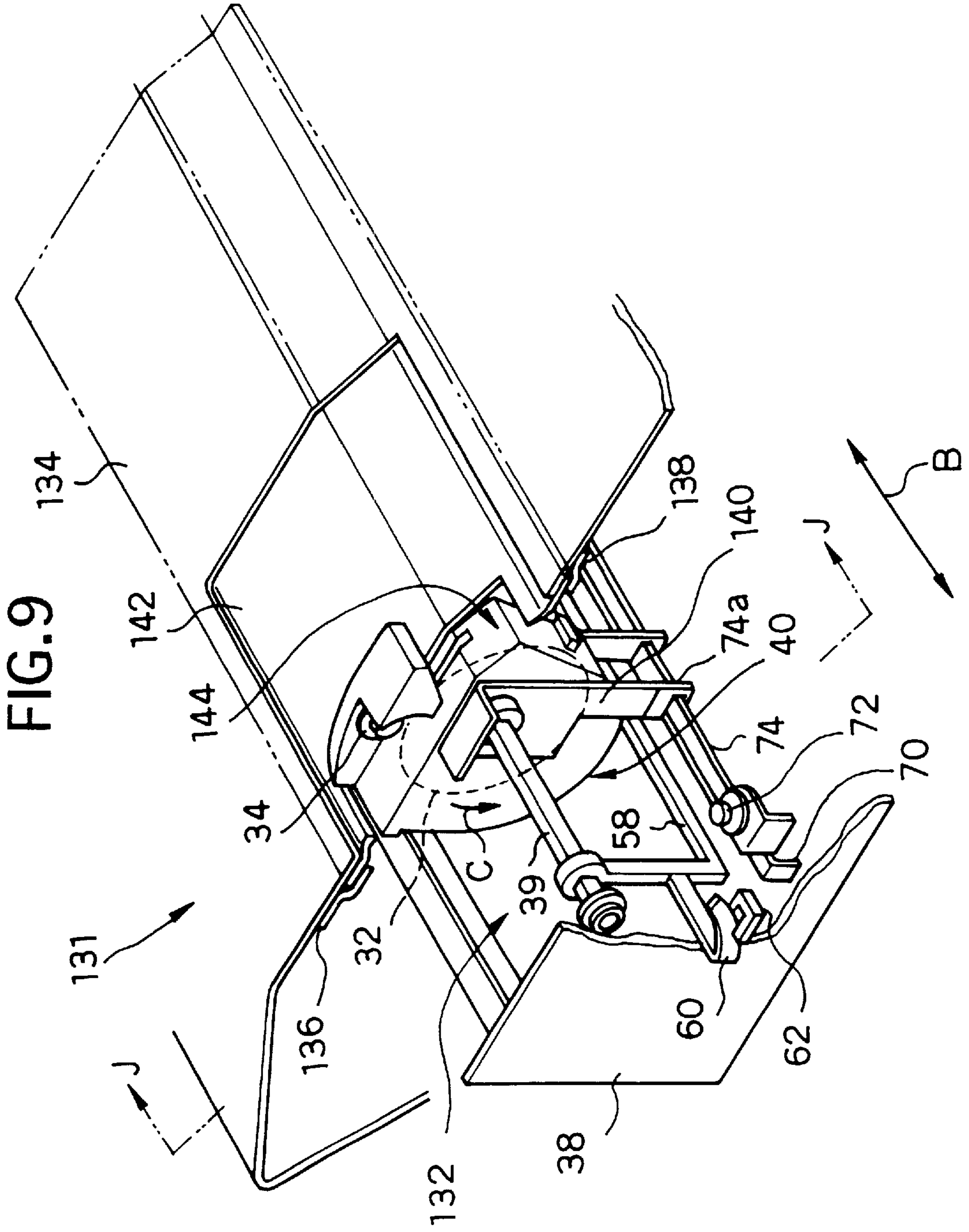
FIG. 9 is a second embodiment of the recording medium cutter according to the present invention.
Figure 10:
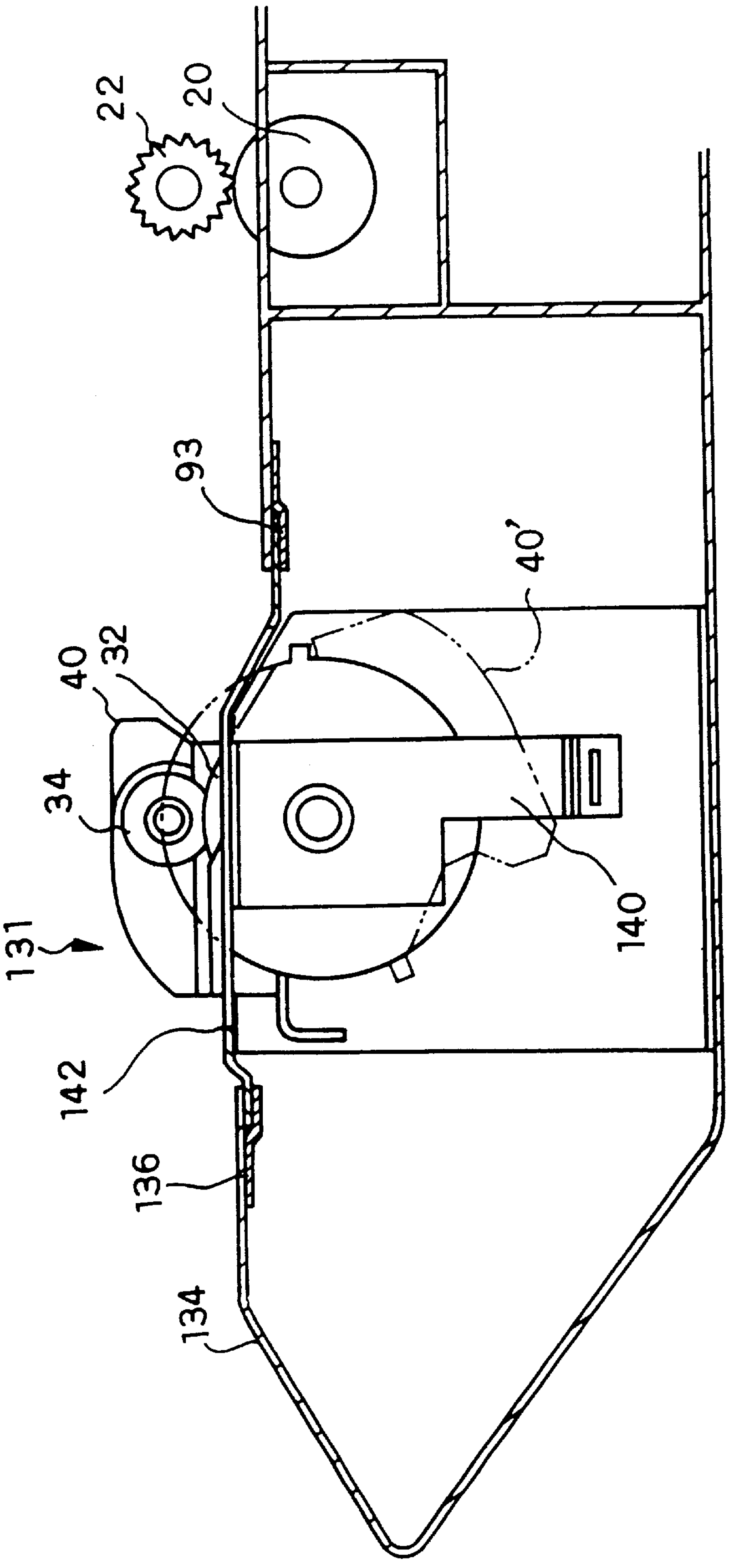
FIG. 10 is a sectional view taken along line J—J of the recording medium cutter of FIG. 9.

Referring to FIGS. 9 and 10, a second embodiment of the recording medium cutter according to the present invention will be described.

FIG. 9 is a perspective view showing a second embodiment of the recording medium cutter according to the present invention. FIG. 10 is a sectional view of the recording medium cutter, taken along a line J—J of FIG. 9. In FIGS. 9 and 10, the same components as in FIGS. 3 and 6 are designated by the same reference numerals.

The recording medium cutter 131 includes an ejection guide plate 134 having formed therein an opening for movement 132, through which the main body 40 moves, which rotatably holds the rotary blade 32 and the driven blade 34 as one body. A travelling piece 140 is provided on both sides of the main body 40 in the direction of arrow B. This travelling piece 140 travels in the B direction as the main body 40 moves in the B direction. A recording medium moving plates 142 is provided, which extends on either side of the upper position of the travelling piece 140 and which travels in the B direction as the main body 40 moves in the B direction.

In FIG. 9, there is an omission of a portion of the recording medium moving plate 142 on the left side in FIG. 9 of the main body 40. In order for the main body 40 to be able to change over from the cutting condition to the non-cutting condition, an opening 144 for the change-over is provided in the recording medium moving plate 142.

The recording medium moving plate 142 has a length greater than the B-direction width of the opening for movement 132 so that the recording medium moving plate 142 can completely cover the opening for movement 132, even when the main body 40 moves to either side end of the opening 132. The recording medium moving plate 142 moves guided by guide rails 136, 138 attached to the inside wall of the top portion of the ejection guide plate 134. The recording medium moving plate 142, as it moves in the B direction, covers the region of the opening for movement, exclusive of the region occupied by the main body 40. As a result, a paper sheet can be moved smoothly without being caught at the opening 132. In FIG. 10, the two-dot chain line indicates the main body 40' in the non-cutting condition. When the main body 40 is in the non-cutting condition, the main body 40 functions as a part of the recording medium moving plate.

Description will next be made of the operation of the plotter using the recording medium cutter, which has been described.

Figure 11:
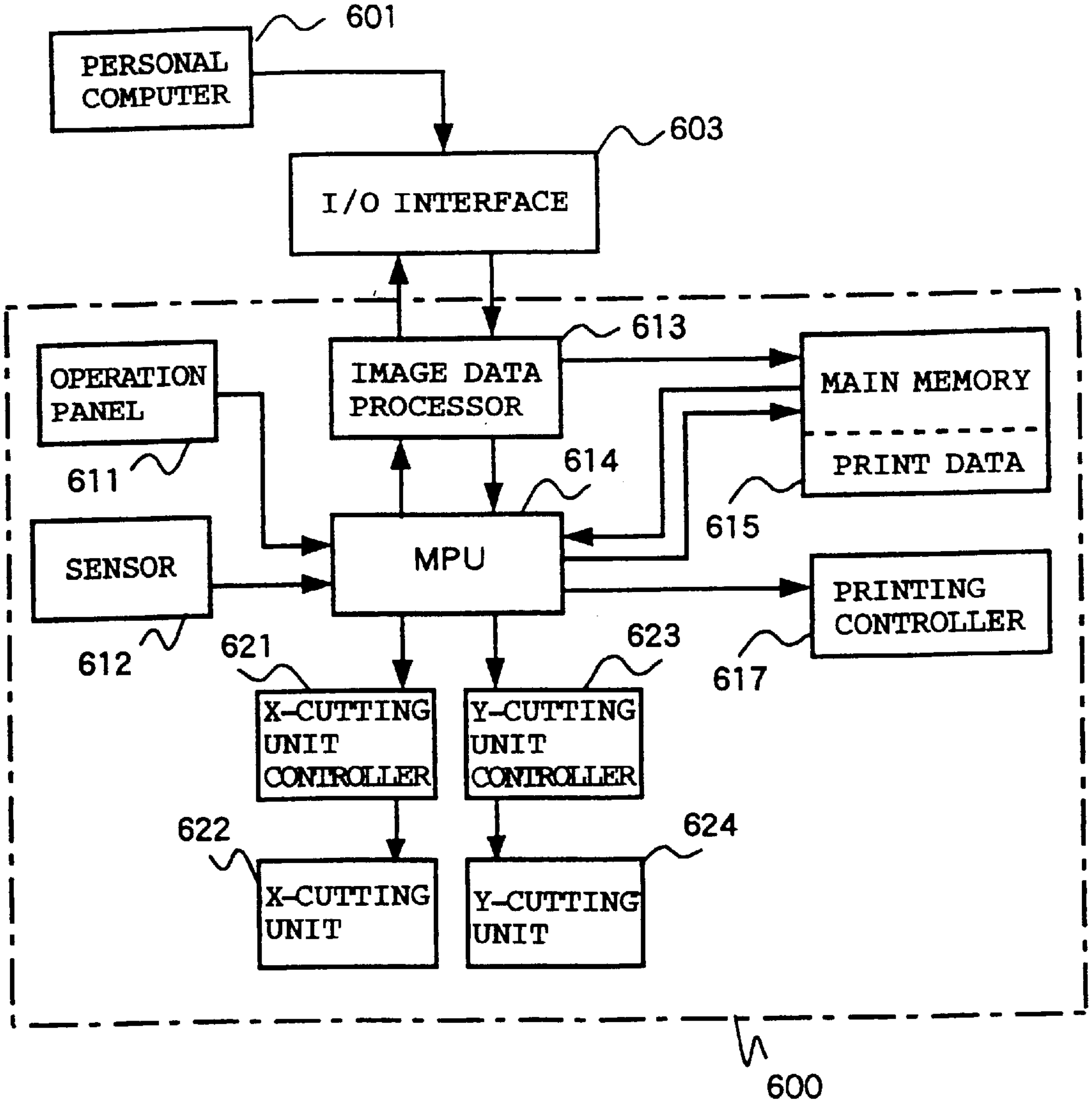
FIG. 11 is a control block diagram of the color plotter in FIG. 1.

FIG. 11 is a control block diagram of the plotter. The plotter 600 includes an operation panel 611 (corresponding to 3 in FIG. 1), sensors 612 for detecting the width, the leading edge, etc. of a paper sheet, and an image data processor 613. The image processor 613 processes image data received through an I/O interface 603 from an external image information source, such as a personal computer 601. The plotter 600 also includes a main memory 615 for providing a storage area of printing data obtained by the image data processor 613 and also providing operation programs and a work data area for a microprocessor described later, and a printing controller 617 for controlling the printing on the basis of printing data. The plotter 600 further includes an X-cutting unit 622 (corresponding to the paper sheet cutter 30), an X-cutting unit controller 621 for controlling the unit 622, a Y-cutting unit 624, a Y-cutting unit controller 623 for controlling the unit 624, and a microprocessor (MPU) 614 for central control of the respective components.

Figure 12:
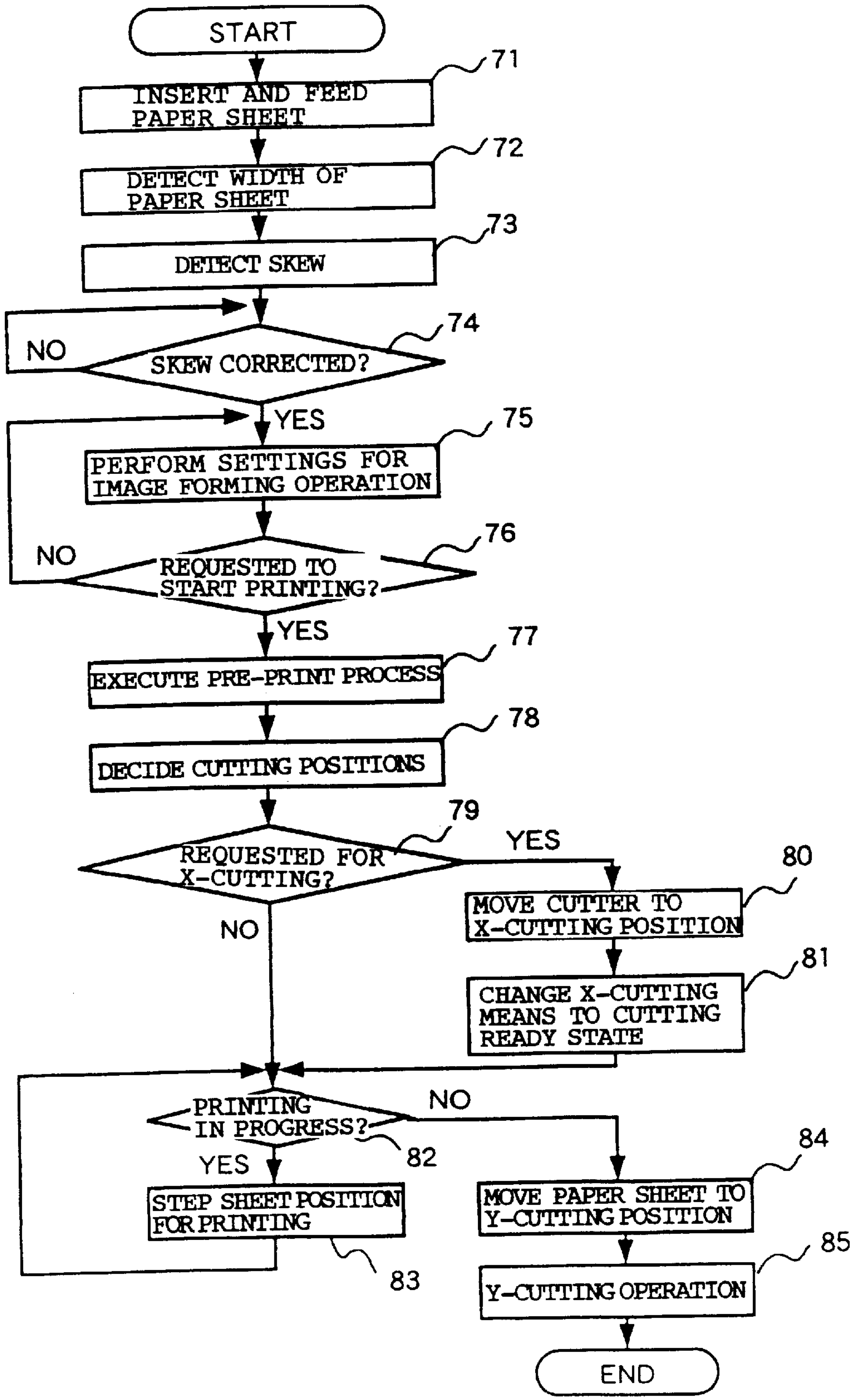
FIG. 12 is a flowchart showing the flow of image forming steps in a third embodiment of the present invention.

FIG. 12 is a flowchart showing the flow of a series of image forming actions of the plotter according to a third embodiment of the present invention.

In an image forming operation, a series of paper sheet setting actions are generally performed, which include an insertion and feeding of a paper sheet (71), a detection of a paper sheet width (left and right edges)(72), a detection of an occurrence of skew (73), and so on. Specific means for these actions are known and their descriptions are omitted.

When any skew has been corrected (74), the plotter main body is placed in a ready state to start an image forming operation. The user operates the personal computer (601 in FIG. 11) or manipulates the operation panel (3 in FIG. 1, 611 in FIG. 11) to perform settings of the plotter main body necessary for the image forming operation, such as a print mode, number of sheets to print, or margins (75). It is possible to disable the X-cutting action, and in step 75 a command to specify whether or not to perform X-cutting can be entered by a user, which information is stored in the main memory (615 in FIG. 11).

In response to a request to start the image forming operation (76), as a pre-print process, image data prepared on the personal computer or the like are read into the plotter. The image data processor (613 in FIG. 11) develops the image data into printing data, and information about a required image area is also calculated, and the result is stored in the main memory (615 in FIG. 11) (77).

The MPU decides an X-cutting position and a Y-cutting position (78). The detail of the process at step 78 will be described by referring to several cases.

On receiving a request for the X-cutting operation (79), the MPU controls the X-cutting unit controller (621 in FIG. 11) to move the X-cutting means to an X-cutting position obtained at step 78 (80). After the X-cutting means reaches the X-cutting position, the MPU puts the X-cutting means into a cutting ready state (81).

Under control by MPU 614, printing takes place on a paper sheet at a predetermined image forming position (82). Then, after the paper sheet is moved by a fixed amount (83), printing is performed on another portion of the paper sheet (a band portion) which has newly appeared at the image forming position. In this embodiment, regarding the X-direction, since the left and right edges (the right edge in particular) of a paper sheet have been detected, an image is formed such that the position on the paper sheet, which is away by the width of the right margin from the right edge of the paper sheet, coincides with the right end of the image area. Regarding the Y-direction, since the leading edge of the paper sheet has been detected, the image is formed such that the position on the paper sheet, which is away by the length of the top margin from the leading edge, coincides with the leading end of the image area. By repeating steps 82 and 83, the image gradually comes to take a complete form. Because the X-cutting means is in the cutting condition, the paper sheet will be cut in the same direction as the paper sheet moving direction by moving the paper sheet by each additional amount. When the printing operation is finished, under control by MPU, when the paper sheet has been moved to the Y-cutting position from the detected leading end position (84), the Y-cutting unit controller (623 in FIG. 11) is actuated to cause the carriage 16 of the Y-cutting unit (624 in FIG. 11) to scan in a direction perpendicular to the paper sheet moving direction (85), by which the Y-cutting operation is performed.

After this, the image-formed paper sheet is ejected from the plotter, by which a series of image forming actions has been completed.

Now, the cutting-position deciding process at step 78 in FIG. 12 will be described in detail with respect to several cases.

Figure 17:
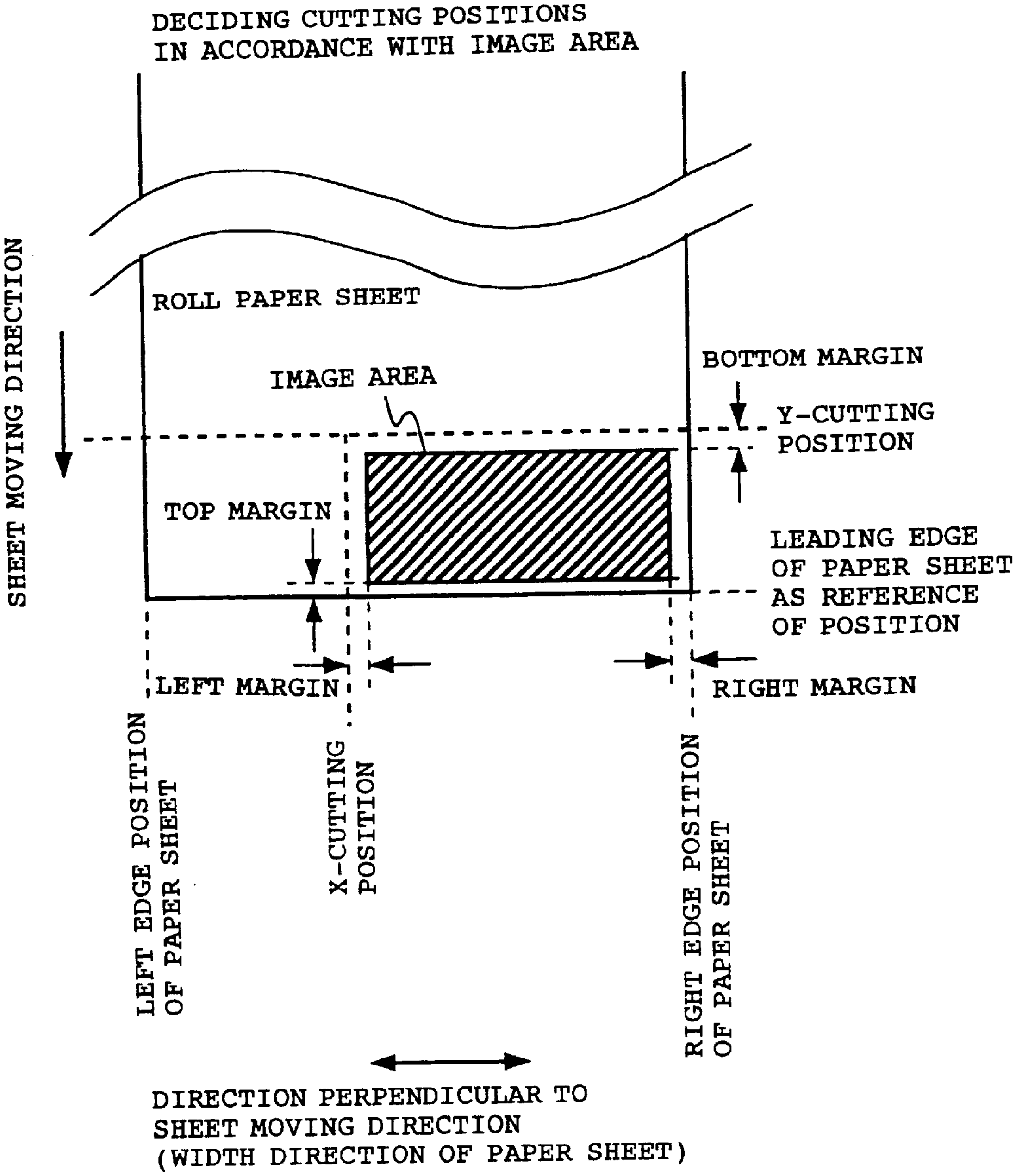
FIG. 17 is an explanatory diagram showing the cutting position by the cutting-position deciding method dependent on an image area in FIG. 13.

Description starts with a first method of deciding the cutting positions, more specifically, a case where the cutting positions to cut a paper sheet are decided on the basis of information about the size of an image, namely, an image area. As shown in FIG. 17, in this method, for image data to be printed, a Y-cutting position and an X-cutting position are decided according to the size of the obtained image area, taking into account the predetermined top and bottom margins and left and right margins with reference to the edge of the paper sheet as the reference.

Figure 13:
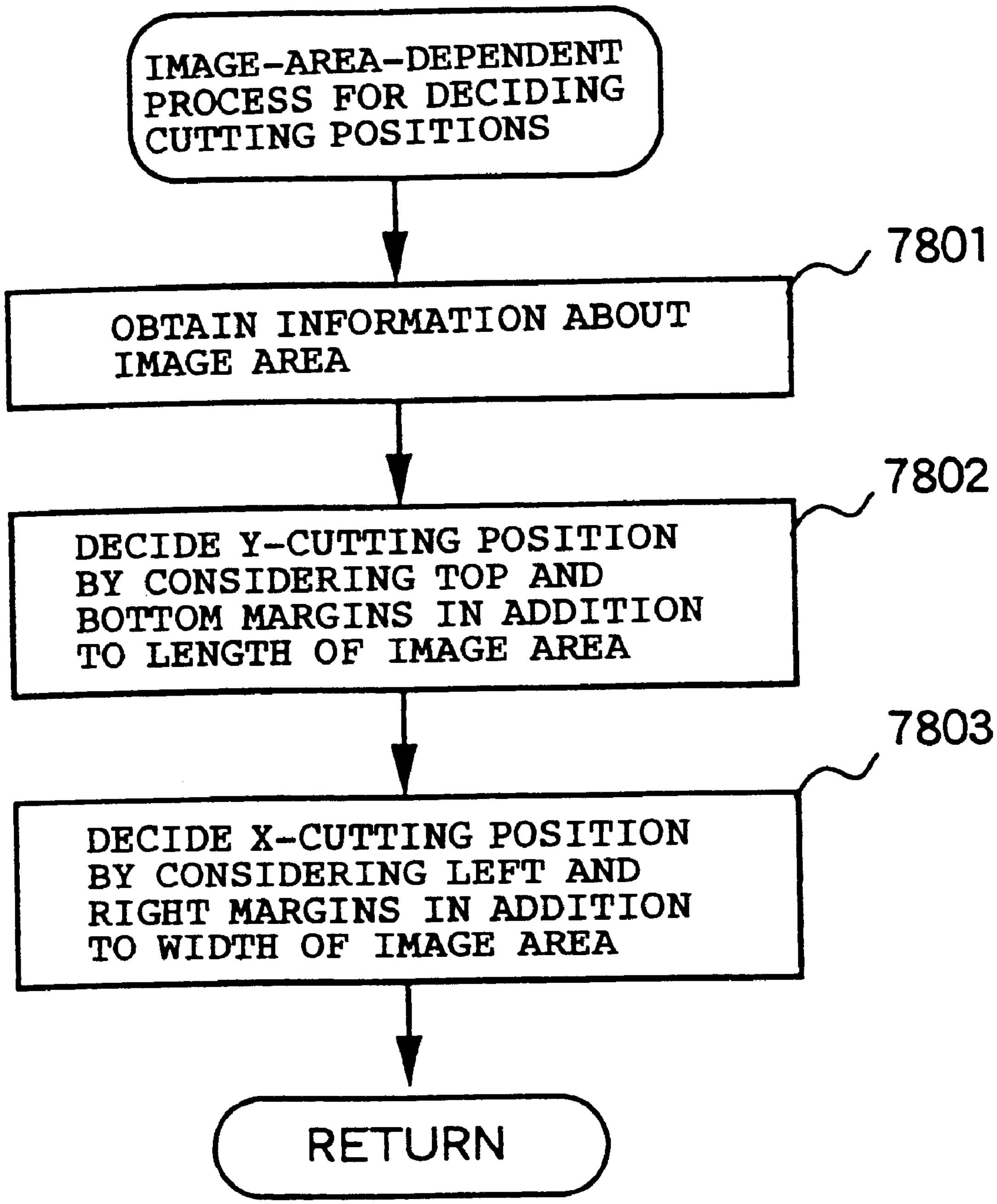
FIG. 13 is a flowchart showing a cutting-position deciding method dependent on an image area corresponding to one step of FIG. 12.
Figure 21:
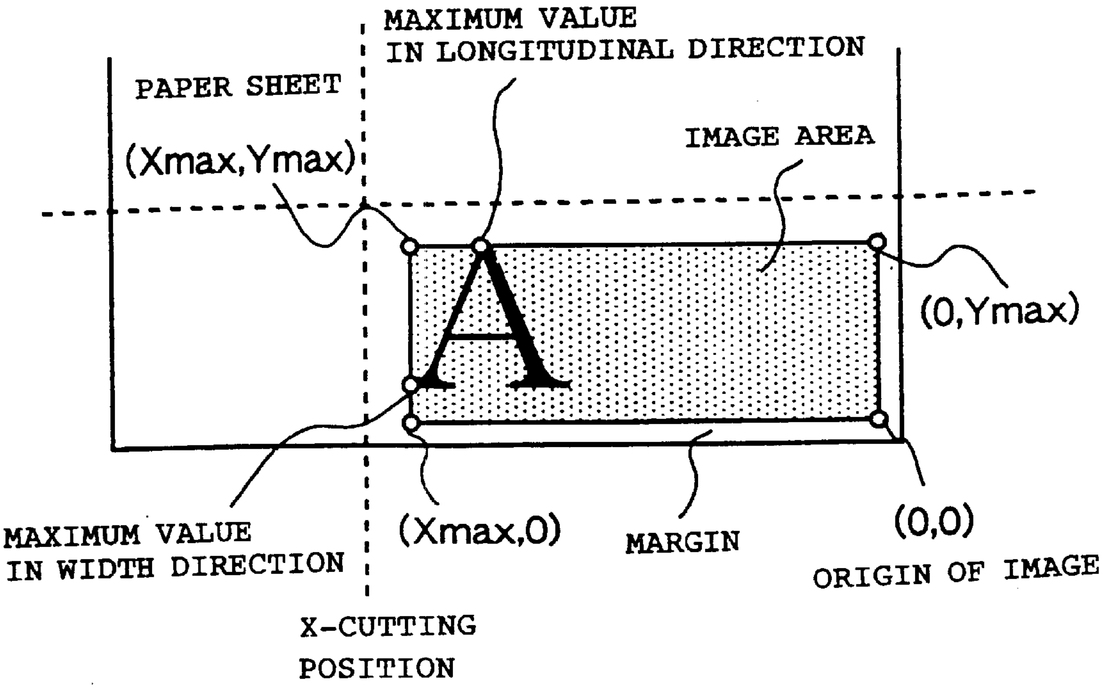
FIG. 21 is an explanatory diagram of the process of obtaining an image area of FIG. 20.

FIG. 13 is a flowchart showing such a method for deciding the cutting positions. To begin with, image area information is obtained (7801). A Y-cutting position is decided by taking into account the top and bottom margins in addition to the length of the image area with reference to the leading edge of the paper sheet (7802). An X-cutting position is decided by taking into account the left and right margins in addition to the width of the image area with reference to the right edge of the paper sheet (7803). The right edge position of paper sheet is not necessarily fixed due to tolerances in paper sheet size. Therefore, the X-cutting position is decided by taking into account information about the right edge position of the paper sheet. As to the Y-direction, the length of a paper sheet is measured on the basis of the feed amount of the paper sheet from the detected leading edge of the paper sheet. Therefore, the length as decided can be used as the Y-cutting position. Image area information is information about the length and the width of an image area. In the third embodiment, as shown in FIG. 21, the "length of an image area" is decided by the position of an image point that is most away from the origin of the image in the Y-direction, that is, the maximum value Ymax in the longitudinal direction. Likewise, the "width of an image area" is decided by the position of an image point that is most away from the origin of the image in the X-direction, that is, the maximum value Xmax in the width direction. The image point is the point where an ink dot of any color is formed in ink jet recording, for example.

In the third embodiment, image area information is calculated in the pre-print process described at step 77 in FIG. 12, but it can be calculated at step 7801 in FIG. 13. When this is done at step 77, the calculation can be carried out as a step accompanying the process of developing image data into printing data.

Figure 20:
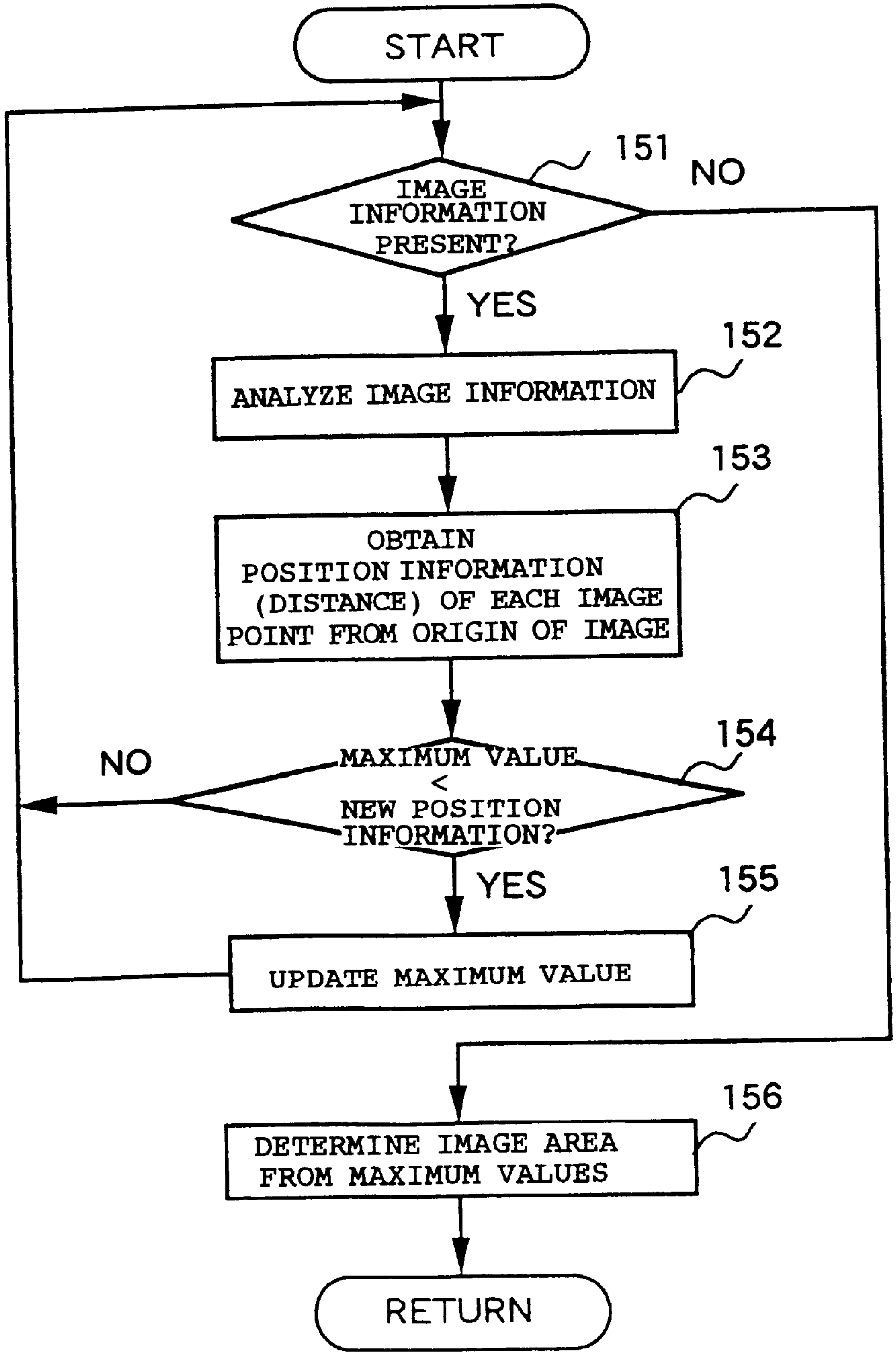
FIG. 20 is a flowchart showing a process of obtaining an image area by the cutting-position deciding method dependent on an image area in FIG. 13.

FIG. 20 shows an example of a process of obtaining image area information. Items of the image information (vector data for example) are sequentially received one by one (151) and analyzed (152). This analysis process is performed to recognize the image points at two ends (start point and end point) of a vector. For the recognized image points, information about X and Y positions (distances) from the origin of the image is obtained based on the coordinate values (153). For each of the X and Y directions, new position information is compared with the current maximum values (154). If the values of the new position are greater, the current maximum values are updated (155), and if not, the process returns to step 151. Those steps are repeated for the next item of the image information. When image information runs out, the length and the width of the image area are determined on the basis of the updated maximum values (156).

By deciding the cutting positions from information about the image area as described above, it is possible to perform the X and the Y-cutting operations at various positions according to individual images.

Now, a second method of deciding the cutting positions will be described.

Figure 18:
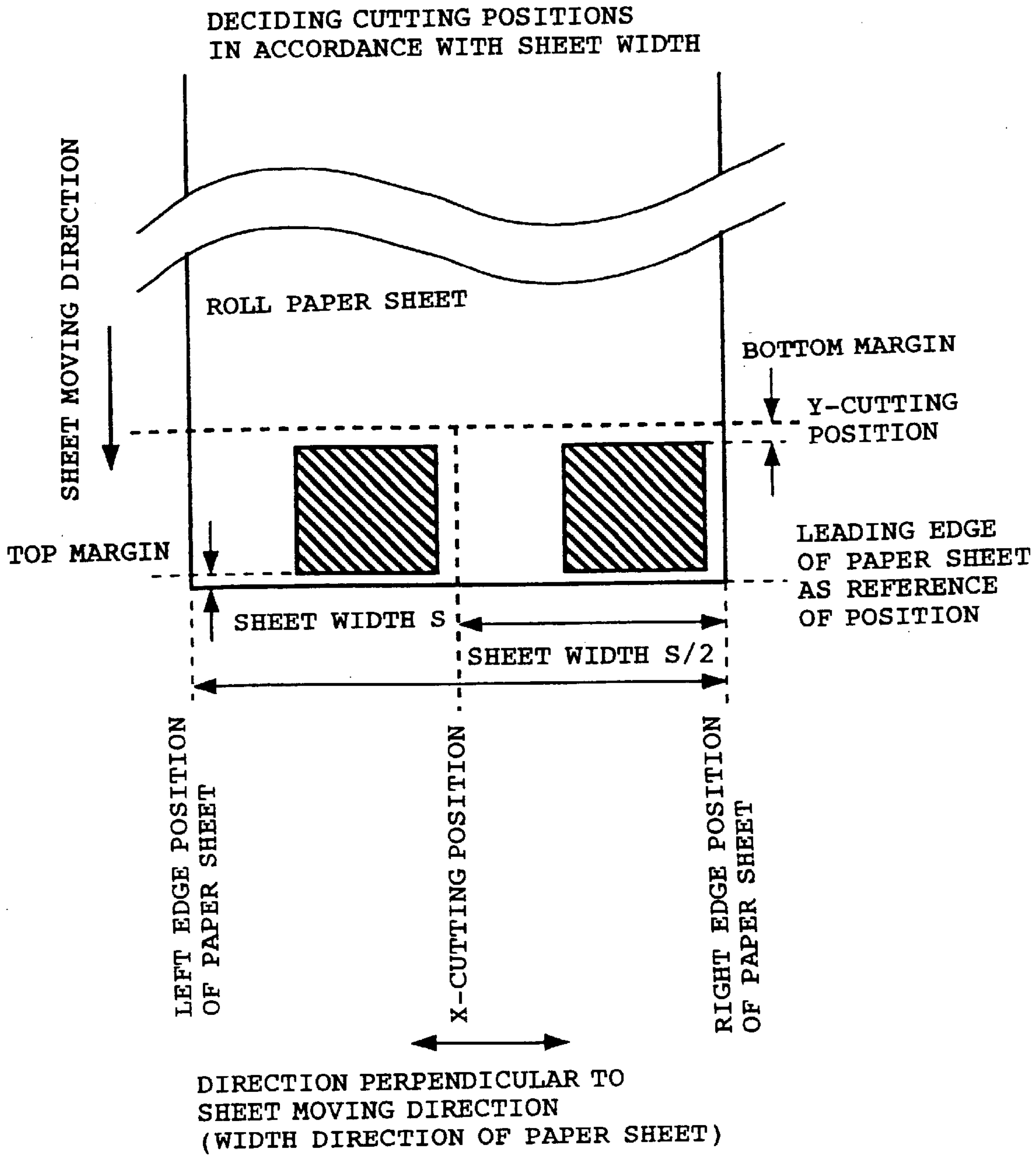
FIG. 18 is an explanatory diagram showing the cutting position by the cutting-position deciding method dependent on the width of paper sheet in FIG. 14.

As shown in FIG. 18, this method is used to decide an adequate X-cutting position on the basis of the width of a paper sheet. This method is suitable for a case of bisecting a wide paper sheet into two equal segments and forming two images, for example. Any optional method may be adopted for deciding the Y-cutting position. For example, as mentioned above, a position decided by taking into account the top and bottom margins in addition to length information of the image area can be used as the Y-cutting position.

Figure 14:
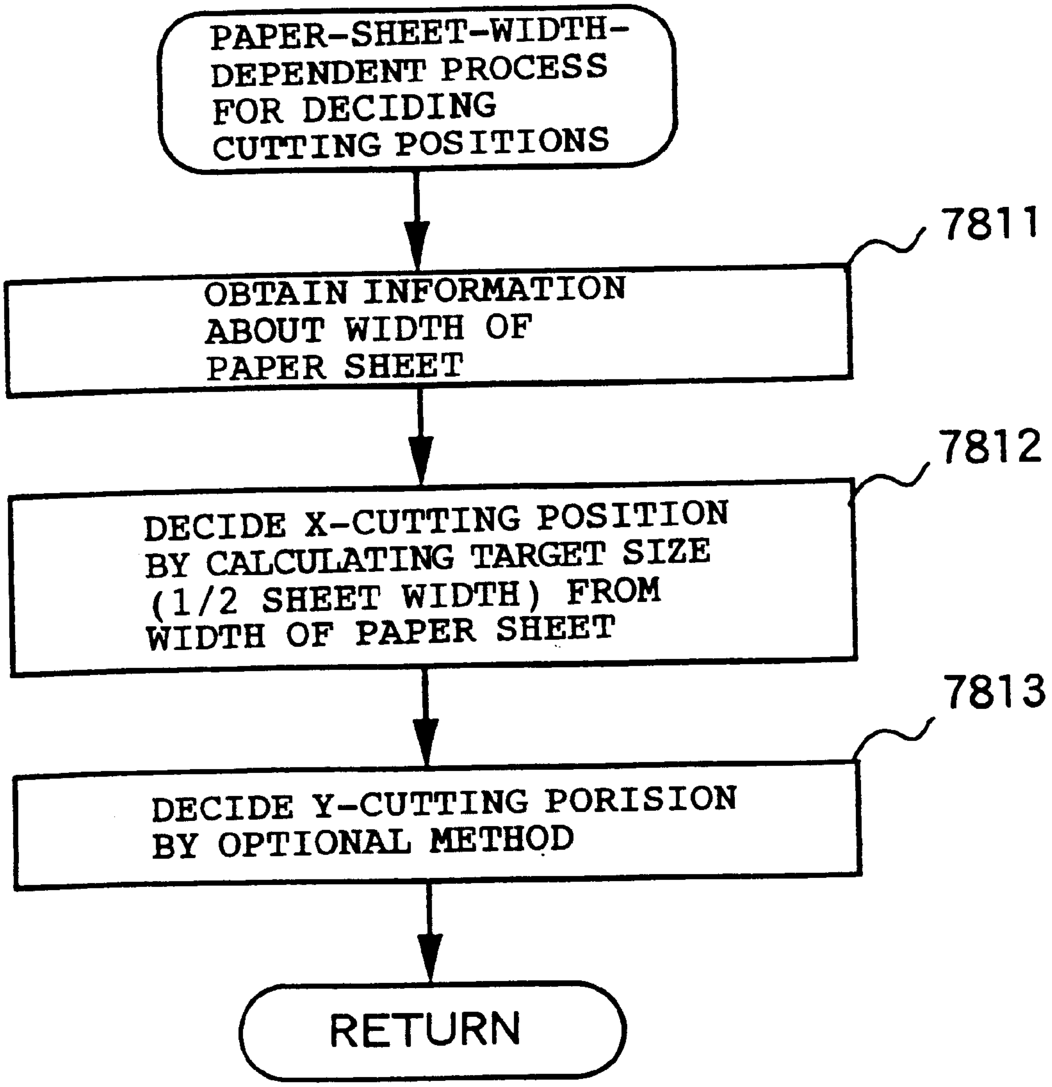
FIG. 14 is a flowchart showing a cutting-position deciding method dependent on the width of a paper sheet corresponding to one step of FIG. 12.

FIG. 14 is a flowchart showing a process of the second method of deciding the cutting positions. Information about the width of a paper sheet is first obtained (7811). This width information has been obtained at step 72 of FIG. 12. A target size (½ the paper sheet width in this case) is obtained from the width of this paper sheet, and by taking into account this size as well as the right edge position of the paper sheet, an X-cutting position is decided (7812). The cutting position thus decided is nothing other than the middle position between the left and right edges of the paper sheet. Therefore, the X-cutting position can be obtained by calculating a mean value (½ the sum) of coordinates of the left and right edges of the paper sheet without calculating ½ of the width of the paper sheet. Then, a Y-cutting position is decided by an arbitrary method (7813).

According to the configuration by which to decide the X-cutting position, when images can be arranged side by side across the width of the paper sheet, it is possible to provide a plurality of printed matters at once, so that a total time of image formation can be reduced.

Figure 19:
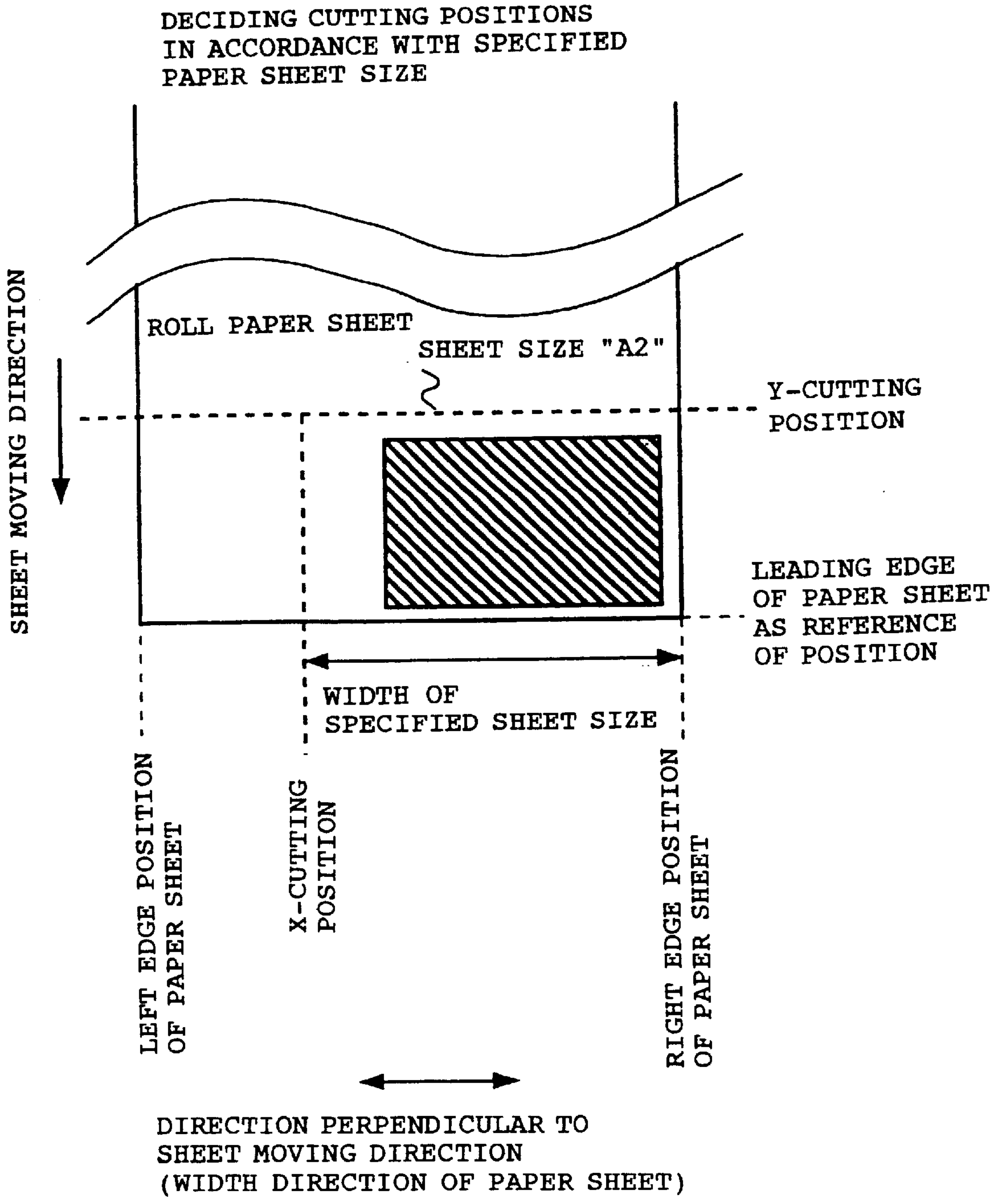
FIG. 19 is an explanatory diagram showing the cutting position by the cutting-position deciding method dependent on a specified paper sheet size in FIG. 15.

A third process of deciding cutting positions will be described. As shown in FIG. 19, this process is conceived to cut out standard sizes of paper sheet (A2, B4, and so on) from a roll of paper sheet (or a large-size cut-sheet). FIG. 19 shows a case of cutting out a paper sheet of A2 size from a roll of paper sheet.

Figure 15:
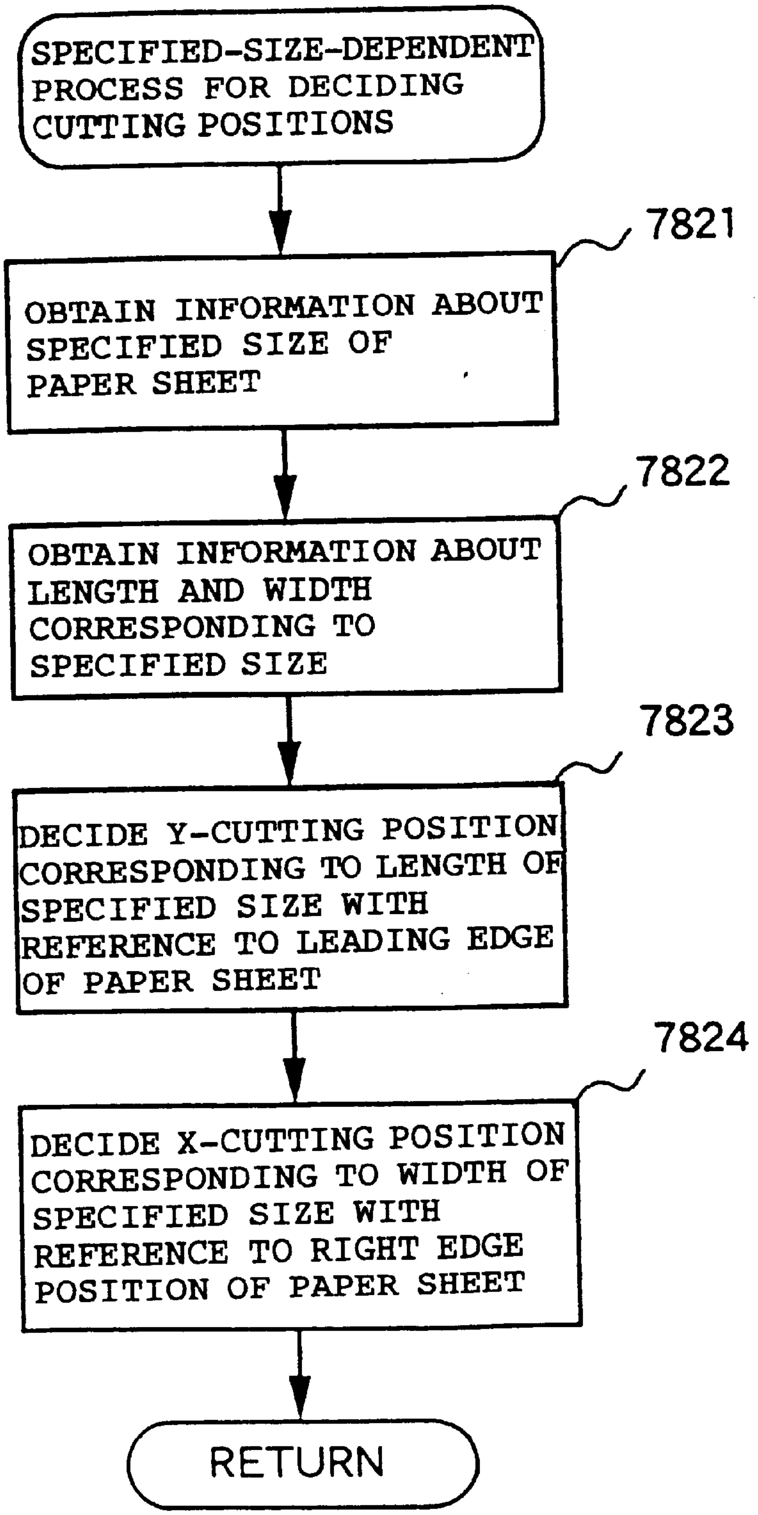
FIG. 15 is a flowchart showing a cutting-position deciding method dependent on a specified paper sheet size corresponding to one step of FIG. 12.

FIG. 15 shows a flowchart of the process in the third method of cutting positions. Information about a specified paper sheet size is first obtained (7821). This information has already been provided at step 75 in FIG. 12. Then, information about the length and width of a paper sheet, which correspond to the specified size, is obtained (7822). For this purpose, reference is made to a paper sheet size table 170 prepared in advance, such as the one shown in FIG. 22. This table 170 has been stored in advance in the main memory 615. The table 170 defines dimensions in width and length of respective standard sizes for each of landscape and portrait (indicated by R). The information about the paper sheet sizes can be written in a program. This is said to be substantially equivalent to the referring to a table. After obtaining the length and the width of a specified size, a Y-cutting position is decided which corresponds to the length of the specified size with reference to the leading edge position of the paper sheet (7823). Then, an X-cutting position is decided which corresponds to the width of the specified size with reference to the right edge of the paper sheet (7824). As has been described, the right edge position of the paper sheet is not necessarily constant due to the tolerance in paper sheet size, for example. Therefore, information about the right edge position of a paper sheet is taken into account in the decision of the X-cutting position. As for the Y direction, the length of paper sheet is measured on the basis of a moving amount of the paper sheet from the detected leading edge position thereof, so that the length of a specified size can be used as the Y-cutting position.

Thus, a paper sheet is cut at a cutting position decided by taking into account information about a user-specified size with reference to the detected edge positions of the paper sheet. In this manner, an image-printed paper sheet can be cut out which exactly matches the size specified from the operation panel.

Description will next be made of a fourth embodiment of the present invention. The basic configuration of the plotter is the same as in the third embodiment. Therefore, only dissimilar operations are described. In the third embodiment, description has been made to a case where only one of the three kinds of cutting-position deciding methods is employed as shown in FIG. 12. In the fourth embodiment, all of the three kinds of cutting-position deciding methods are employed so that the user can select from the operation panel one method for each image forming operation, and by the selected method, the cutting position of the paper sheet is decided.

Figure 16:
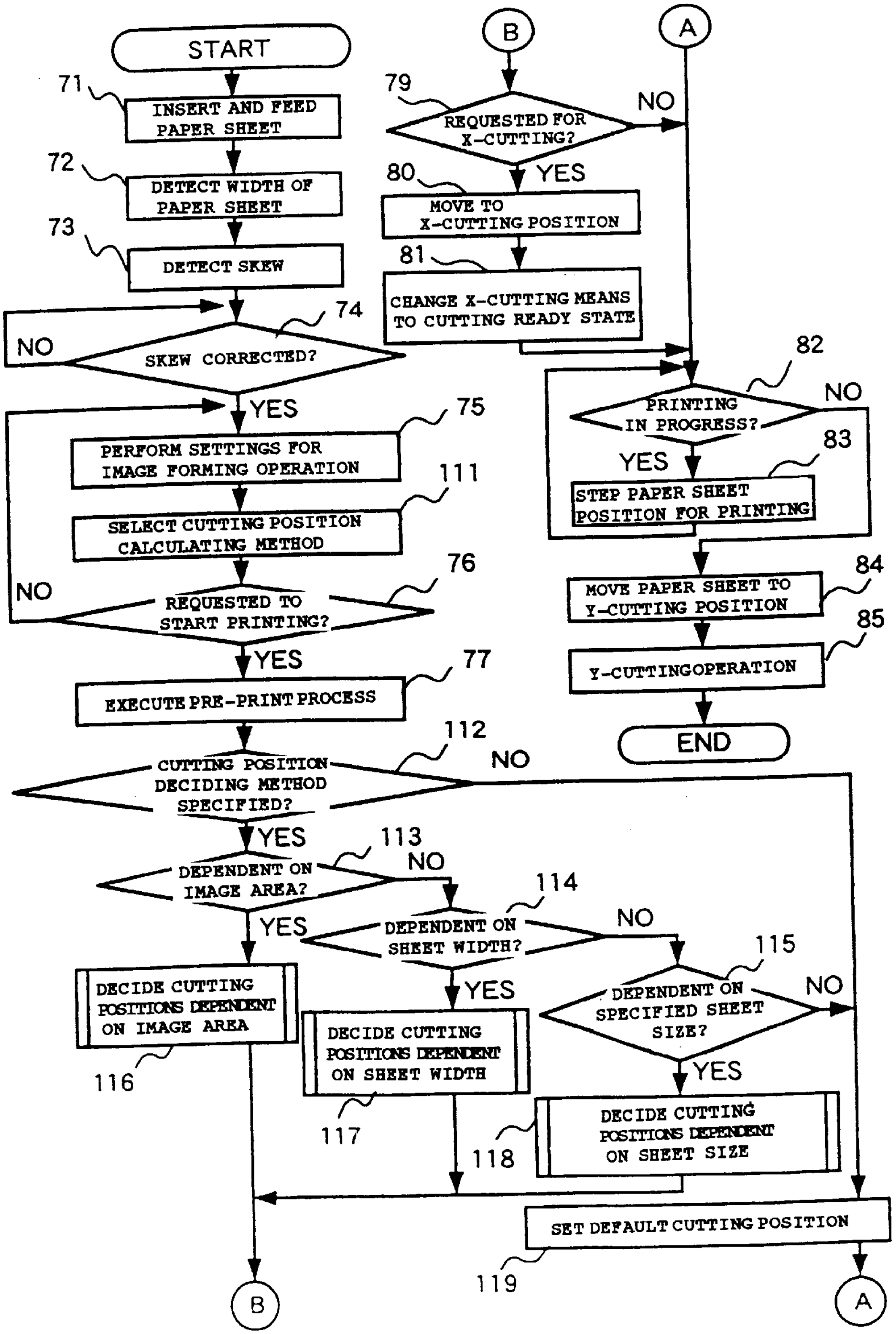
FIG. 16 is a flowchart showing the flow of image forming steps in a fourth embodiment of the present invention.

FIG. 16 is a flowchart showing an operation of the plotter of the fourth embodiment.

In FIG. 16, steps 71 to 75 are the same as those in FIG. 12. Step 75 is followed by the selection of a cutting-position calculation method (111). The user makes this decision by manipulating the switches or the like (not shown) on the operation panel 611 or specifies a method from a personal computer on-line.

When a request to start the image forming operation is received (76), as in the third embodiment, the pre-print process is performed, which includes receiving image data, developing of printing data, and reading additional necessary information into the main memory 615 (77).

Then, reference is made to information about the cutting-position decision method specified and stored in the main memory 615 (112).

Description will start with a case where any cutting-position deciding method was not specified (NO at 112). In this case, a default cutting position is set (119), and printing is started. Subsequently, an image is formed by repeating the printing and paper sheet stepping (82, 83). After the image has been formed, the paper sheet is moved to the Y-cutting position set by default (84), a Y-cutting operation takes place (85), and the image forming operation is completed.

Description will proceed to a case where a cutting-position deciding method was specified (YES at 112).

If the specified cutting-position deciding method is dependent on information about the image area (YES at 113), then the cutting positions dependent on the image area are decided (116). The details are the same as have been described with reference to FIG. 13.

If the specified cutting-position deciding method is dependent on information about the width of a paper sheet (YES at 114), then the cutting-positions dependent on the paper sheet width are decided (117). The details are the same as what has been described with reference to FIG. 14.

If the specified cutting-position deciding method is dependent on information about the standard size of a paper sheet specified from the operation panel (YES at 115), then the cutting-positions dependent on the specified paper sheet size are decided (118). The details are the same as in the description of FIG. 15.

After a cutting-position decision has been made as specified, a decision is made whether or not an X-cutting operation is made (79). When an X-cutting operation is not to be performed (NO at 79), the plotter starts to print.

If an X-cutting operation is to be performed (YES at 79), the MPU 614 controls the X-cutting unit controller (621 in FIG. 11) (80) to bring the X-cutting means to the X-cutting position, and after the X-cutting means has reached the X-cutting position, puts the X-cutting means in the cutting ready state (81). Subsequently, printing will be started.

After printing has started, under control by the MPU 614, printing takes place on a paper sheet at a specified image forming position (82), and after the paper sheet is moved forward by a certain stepping amount (83), printing takes place again on the portion of the paper sheet that has newly come to the image forming position. By repeating these processes, an image is formed (82–83). As described above, when the X-cutting means is in the cutting ready state, each time the paper sheet is moved by a certain stepping amount, the paper sheet is cut in the same direction as the sheet moving direction.

When the printing operation has been completed, the paper sheet is moved to the Y-cutting position obtained as described (84) under control by MPU 614. After this, the Y-cutting unit controller 623 is actuated to cause the carriage 16 conveying the Y-cutting means to scan in a direction perpendicular to the sheet moving direction, by which the Y-cutting operation is performed (85).

Subsequently, the image-formed paper sheet is ejected from the plotter main body, and a series of image forming operations are ended.

According to the fourth embodiment, it is possible to select a desired cutting-position deciding method from among a method dependent on the image area, a method dependent on the width of a paper sheet and a method dependent on the specified size of a paper sheet, in order to satisfy a user's need or to respond to the condition of the system.

Only the preferred embodiments of the present invention have been described, but changes and modifications of the present invention are possible without departing from the spirit and the scope of the invention. For example, only one unit of the X-cutting means is used in the description, but a plurality of the X-cutting means may be provided. More specifically, if two or more X-cutting means are used simultaneously, the X-cutting can be performed to cut the paper sheet width into three or more equal segments.

As has been described, with the recording medium cutter according to the present invention, by rotating the holding means holding the rotary and driven blades by a rotating means, the rotary and driven blades can quickly be moved from the non-cutting position to the cutting position, so that the time for cutting can be reduced.

In the recording medium cutter according to the present invention, the rotary and driven blades are held as one body by a holding means, resulting in the gap between the two blades being kept fixed at a desired value. Therefore, the recording medium can be cut cleanly at a correct position.

The provision of the ejection guide plate, which guides the recording medium to the sheet ejecting direction and the cutting-unit-movable opening in the ejection guide plate, which is closed as the holding means moves, allows the recording medium to be moved smoothly thereon.

In addition, according to the present invention, in an image forming device having at least a cutting unit for cutting a paper sheet longitudinally, a longitudinal cutting position of the paper sheet can be decided with high accuracy according to the image area, the sheet width or the specified size of the paper sheet.

INDUSTRIAL APPLICABILITY

The present invention is preferably applied to the design and the manufacture of an image forming device, such as a plotter or the like and a recording medium cutter used in the image forming device.

What is claimed is:

1. A recording medium cutter for use in an image forming device for forming an image on a recording medium moved to an image forming area, said cutter being located downstream of said image forming area in the moving direction of said recording medium, for cutting the recording medium being moved, said recording medium cutter comprising:

a rotary blade for cutting, while rotating, a recording medium in the moving direction thereof;

a driven blade driven by the rotary blade for cutting, while rotating, the recording medium in the moving direction thereof, in cooperation with said rotary blade;

a blade holder rotatable about a center axis of said rotary blade while rotatably holding said rotary blade and said driven blade with a positional relationship between the two blades kept fixed such that the two blades are always in contact with each other; and a rotater for pivotally rotating said blade holder between a cutting position where said recording medium is cut and a non-cutting position where said recording medium is not cut.

2. A recording medium cutter according to claim 1, wherein said blade holder includes a guide portion for guiding the recording medium when said driven blade is located at said non-cutting position.

3. A recording medium cutter according to claim 1, wherein said rotater includes a single driver for rotating said rotary blade and said blade holder as well.

4. A recording medium cutter according to claim 3, wherein said rotater continues to rotate said rotary blade still after said blade holder has reached said cutting position and has stopped rotating.

5. A recording medium cutter according to claim 1, wherein said rotary blade and said driven blade respectively have center axes substantially parallel with each other, and wherein said rotary blade and said driven blade are pressed against each other on their side faces.

6. A recording medium cutter according to claim 5, wherein the rotation of said blade holder can be realized by said driven blade revolving around said rotary blade as said rotary blade rotates on its axis, and said recording medium cutter includes first and second stoppers for stopping the rotation of said blade holder at said cutting position and said non-cutting position, respectively.

7. A recording medium cutter according to claim 1, further comprising a mover for moving said blade holder in a direction perpendicular to the recording medium moving direction.

8. A recording medium cutter according to claim 1, further comprising a recording medium divider and guider for guiding, out of a pair of segments of the medium cut out by the rotary and driven blades, a segment of the medium on the rotary blade side relative to a cutting point, where the rotary and driven blades come into contact with the recording medium, in a direction of going away from the center axis of the rotary blade and also guiding a segment of the medium on the driven blade side relative to the cutting point in a direction of going away from the center axis of the driven blade, said recording medium divider and guider being located downstream of the cutting point in the recording medium moving direction.

9. A recording medium cutter according to claim 6, wherein one of said first and second stoppers serves also as a position detector for detecting a rotational position of said blade holder.

10. A recording medium cutter according to claim 1, further comprising:

an ejection guide plate for guiding the recording medium moving in a sheet ejecting direction, said ejection guide plate having formed therein an opening for said blade holder to move through in a direction perpendicular to the recording medium moving direction; and a recording medium moving plate capable of closing that area in said opening for movement other than the area occupied by said blade holder and movable with the movement of said blade holder.

11. An image forming device for forming an image on a paper sheet on the basis of image data while moving the paper sheet to an image forming section, said image forming device comprising:

paper sheet side edge detecting means for detecting the position of at least one of two side edges of the paper sheet which are parallel with a paper sheet moving direction;

transverse cutting means for cutting the paper sheet in a direction perpendicular to the paper sheet moving direction;

longitudinal cutting means for cutting the paper sheet in the same direction as the paper sheet moving direction by utilizing power of moving the paper sheet, said longitudinal cutting means being mounted movably in a direction perpendicular to the paper sheet moving direction;

longitudinal cutting control means for moving and setting said longitudinal cutting means at a longitudinal cutting position;

image area detection means for obtaining information about an area of an image based on said image data by checking positions of image points that are most away from the origin of the image respectively in the paper sheet moving direction and in the direction perpendicular to the paper sheet moving direction;

transverse cutting-position deciding means for deciding a transverse cutting position according to image area information obtained by said image area detection means; and longitudinal cutting-position deciding means for deciding a longitudinal cutting position according to information about the paper sheet side edge detected by said paper sheet side edge detecting means and said image area information;

wherein said longitudinal cutting control means moves and sets said longitudinal cutting means at a longitudinal cutting position decided by said longitudinal cutting-position deciding means.

12. An image forming device according to claim 11, wherein said transverse cutting-position deciding means takes into account a top margin and a bottom margin for the image, which have been set before the formation of the image, in making a decision on said transverse cutting position, and wherein said longitudinal cutting-position deciding means takes into account a left margin and a right margin for the image, which have been set before the formation of the image, in making a decision on said longitudinal cutting position.

13. An image forming device for forming an image on a recording paper sheet on the basis of image data while moving the paper sheet to an image forming section, said image forming device comprising:

paper sheet side edge detecting means for detecting the positions of two side edges of the paper sheet which are parallel with a paper sheet moving direction;

longitudinal cutting means for cutting the paper sheet in the same direction as the paper sheet moving direction by utilizing power of moving the paper sheet, said longitudinal cutting means being mounted movably in a direction perpendicular to the paper sheet moving direction;

longitudinal cutting control means for moving and setting said longitudinal cutting means at a longitudinal cutting position; and longitudinal cutting-position deciding means for deciding a longitudinal cutting position according to positional information about the two side edges of the paper sheet, obtained by said paper sheet side edge detecting means;

wherein said longitudinal cutting control means moves and sets said longitudinal cutting means at a longitudinal cutting position decided by said longitudinal cutting-position deciding means.

14. An image forming device according to claim 13, wherein said longitudinal cutting-position deciding means decides an intermediate position between the two side edges of the paper sheet as a longitudinal cutting position.

15. An image forming device for forming an image on a recording paper sheet on the basis of image data while moving the paper sheet to an image forming section, said image forming device comprising:

transverse cutting means for cutting the paper sheet in a direction perpendicular to a paper sheet moving direction; longitudinal cutting means for cutting the paper sheet in the same direction as the paper sheet moving direction by utilizing power of moving the paper sheet, said longitudinal cutting means being mounted movably in a direction perpendicular to the paper sheet moving direction;

image area detection means for obtaining information about an area of an image based on said image data;

paper sheet side edge detecting means for detecting the positions of two side edges of the paper sheet which are parallel with the paper sheet moving direction;

size checking means for checking whether a paper sheet size specified for said image data is any one of a plurality of standard paper sheet sizes; and cutting-position deciding method selecting means for selecting any of a first cutting-position deciding method for deciding a longitudinal cutting position and a transverse cutting position according to image area information obtained by said image area detection means, a second cutting-position deciding method for deciding a longitudinal cutting position according to information about both side edges of the paper sheet obtained by said paper sheet side edge detecting means, and a third cutting-position deciding method for deciding a longitudinal cutting position and a transverse cutting position according to information about the standard paper sheet size obtained by said size checking means.

* * * * *